US012802302B2

(12) United States Patent
Dhingra et al.

(10) Patent No.: US 12,802,302 B2
(45) Date of Patent: Nov. 17, 2026

(54) HIERARCHICAL SEMANTIC GROUPING IN IMAGE VECTORIZATION

(71) Applicant: Adobe Inc., San Jose, CA (US)

(72) Inventors: Sumit Dhingra, New Delhi (IN); Ankit Phogat, Noida (IN); Nitesh Dodeja, Delhi (IN); Shubham Garg, Kaithal (IN); Keerti Harpavat, Udaipur (IN); Aditi Singhania, Raipur (IN); Vishwas Jain, Bangalore (IN); Jaswant Singh Ranawat, Chittorgarh (IN); Souymodip Chakraborty, Bangalore (IN); Vineet Batra, Pitam Pura (IN)

(73) Assignee: Adobe Inc., San Jose, CA (US)

( * ) Notice: Subject to any disclaimer, the term of this patent is extended or adjusted under 35 U.S.C. 154(b) by 248 days.

(21) Appl. No.: 18/753,190

(22) Filed: Jun. 25, 2024

(65) Prior Publication Data

US 2025/0391068 A1 Dec. 25, 2025

(51) Int. Cl.
*G06T 11/23* (2026.01)
*G06T 7/11* (2017.01)

(52) U.S. Cl.
CPC ................ *G06T 11/23* (2026.01); *G06T 7/11* (2017.01); *G06T 2200/24* (2013.01); *G06T 2210/21* (2013.01)

(58) Field of Classification Search
None
See application file for complete search history.

(56) References Cited

U.S. PATENT DOCUMENTS

| | | | | |
|---|---|---|---|---|
| 9,881,226 | B1 * | 1/2018 | Rybakov | G06F 16/583 |
| 2014/0037198 | A1 * | 2/2014 | Larlus-Larrondo | G06T 7/11 382/173 |
| 2021/0150682 | A1 * | 5/2021 | Sytnik | G06T 5/50 |
| 2022/0114698 | A1 * | 4/2022 | Liu | G06T 3/4046 |
| 2022/0148233 | A1 * | 5/2022 | Agarwal | G06T 11/10 |

(Continued)

OTHER PUBLICATIONS

Alexander Kirillov et al. "Segment Anything", arXiv preprint arXiv: 2304.02643v1, Apr. 5, 2023.

(Continued)

*Primary Examiner* — Ryan M Gray
(74) *Attorney, Agent, or Firm* — Keller Preece PLLC

(57) ABSTRACT

The present disclosure is directed toward systems, methods, and non-transitory computer readable media that provide that provide processes and a graphical user interface tailored to organize vector geometry within a vector image into a hierarchical structure based on layered semantic groups. In particular, in one or more embodiments, the disclosed systems determine, using an object segmentation model, a set of masks corresponding to objects depicted within a raster image. The disclosed systems determine an intersection between a first mask and a second mask from among the set of masks. The disclosed systems generate a hierarchical semantic structure comprising a set of nodes corresponding to the set of masks by generating a first node for the first mask and a second node for the second mask arranged according to the intersection. The disclosed systems generate a vector image from the raster image according to the hierarchical semantic structure.

20 Claims, 11 Drawing Sheets

(56) References Cited

U.S. PATENT DOCUMENTS

| | | | | |
|---|---|---|---|---|
| 2022/0237799 A1* | 7/2022 | Price | G06T 7/174 |
| 2023/0154075 A1* | 5/2023 | Tailang | G06T 11/23<br>345/442 |

OTHER PUBLICATIONS

I.N. Herstein. "Topics in Algebra", Xerox College Pub., (1975) ISBN: 9780536010902. URL: https://books.google.co.in/books?id=IgfvAAAAMAAJ.

Lu Qi, Jason Kuen, YiWang, Jiuxiang Gu, Hengshuang Zhao, Zhe Lin, Philip H. S. Torr, and Jiaya Jia. "Open-World Entity Segmentation", arXiv preprint arXiv: 2107.14228v2, Nov. 30, 2021.

Praveen Kumar Dhanuka, Vineet Batra, Ankit Phogat, and Sumit Dhingra. "Automatic Vector Graphic Organization and Asset Extraction", In: ACM SIGGRAPH 2020 Posters. SIGGRAPH '20. Virtual Event, USA: Association for Computing Machinery, 2020. ISBN: 9781450379731. DOI: 10.1145/3388770.3407427. URL: https://doi.org/10.1145/3388770.3407427.

* cited by examiner

HIERARCHICAL SEMANTIC GROUPING IN IMAGE VECTORIZATION

BACKGROUND

Vectors and their unique characteristics provide remarkable image editing features which incentivize image vectorization to create vector images from raster images. In the realm of image vectorization, existing systems are able to generate or extract scalable vector graphics (SVGs), but they do so without providing further contextual meaning to understand relationships among vector paths. Indeed, while existing systems are able to extract SVGs from raster images, the extracted SVGs are essentially flat. This is true even for existing systems that attempt to organize Bezier bounded geometry using metrics such as affine similarity and visual saliency. Consequently, existing systems have a number of shortcomings with regard to accuracy and operational efficiency when performing image vectorization to generate vector images from raster images.

SUMMARY

One or more embodiments provide benefits and/or solve one or more of the foregoing or other problems in the art with systems, methods, and non-transitory computer readable storage media that generate and provide a hierarchical semantic grouping for vector paths extracted from a raster image. In particular, the disclosed systems provide editable scalable vector graphics (SVGs) that cater to the needs of both designers and downstream applications. To achieve this, the disclosed systems generate SVGs in a layer-wise manner aligning with human perception and offering a level of consistency that simplifies the editing process. In certain embodiments, the disclosed systems organize vector geometry in a hierarchical manner, grouping semantically similar elements unto clusters. This structure substantially enhances editability through selection and modification of semantic groups, facilitating precise and efficient editing, especially in iterative design processes.

BRIEF DESCRIPTION OF THE DRAWINGS

This disclosure will describe one or more example embodiments of the systems and methods with additional specificity and detail by referencing the accompanying figures. The following paragraphs briefly describe those figures, in which.

DETAILED DESCRIPTION

Figure 1:
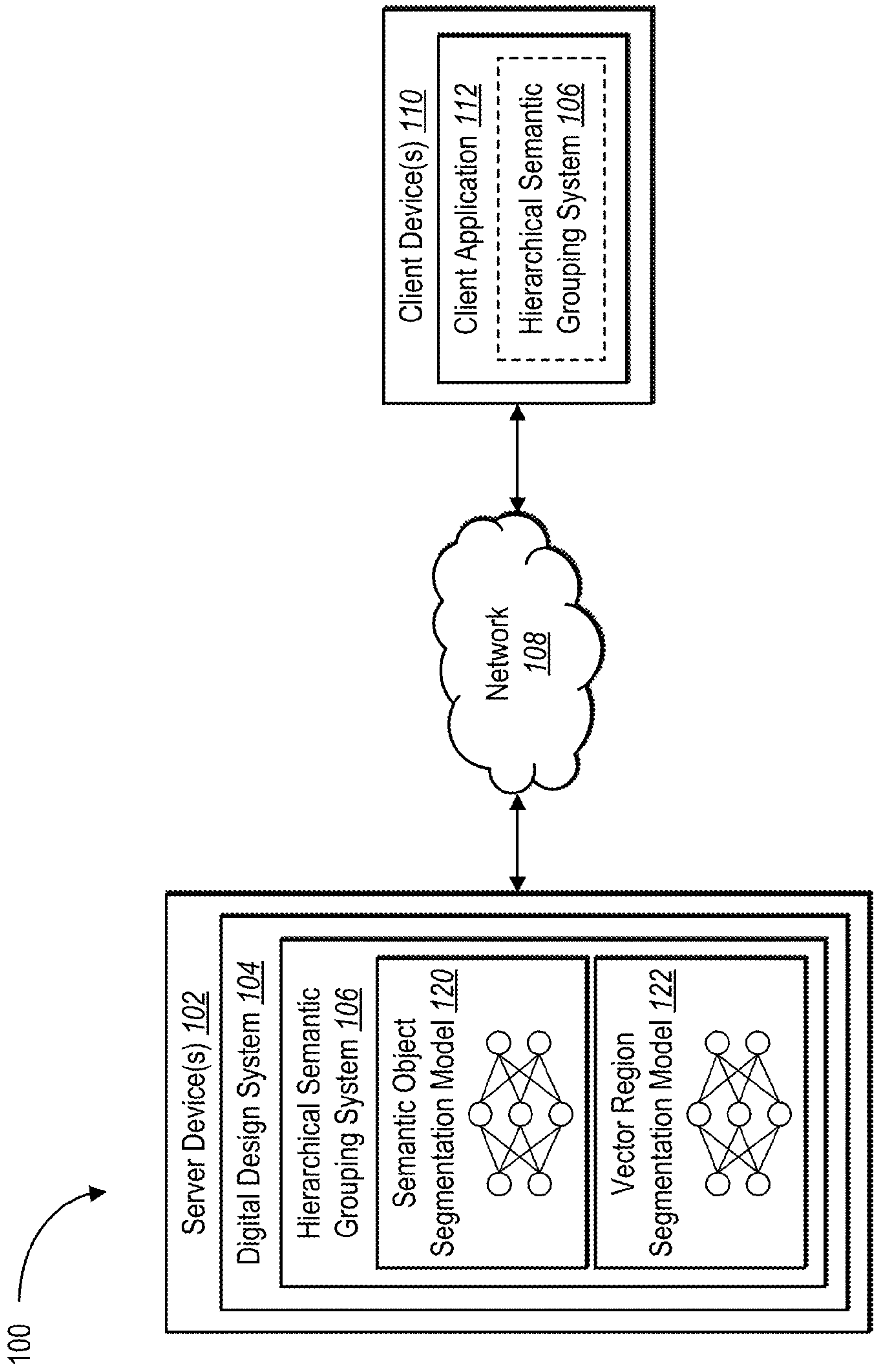
FIG. 1 illustrates a schematic diagram of an example environment of a hierarchical semantic grouping system in accordance with one or more embodiments.

This disclosure describes one or more embodiments of a hierarchical semantic grouping system that generates and provides a hierarchical semantic grouping of vector paths extracted from a raster image. In particular, the hierarchical semantic grouping system performs a vectorization process on a raster image to extract regions of vector paths and further arranges the regions into nodes of a hierarchical semantic tree made up of nodes corresponding to object masks extracted from the raster image. For example, the disclosed systems utilize a semantic object segmentation model to generate object masks for objects depicted within a raster image. In one or more embodiments, the disclosed systems generate a hierarchical semantic structure based on the object masks by arranging nodes according to semantic relationships. In some cases, the disclosed systems employ a vector region segmentation model to extract a set of vector regions tracing paths along (boundaries of) content depicted in the raster image. Furthermore, the disclosed systems map the vector regions to the nodes using an intersection-based approach.

As just mentioned, in some embodiments, the hierarchical semantic grouping system uses an intersection-based approach to map vector paths to nodes of a semantic tree structure for organizing vectors into groups or layers. As part of the vectorization process, in one or more embodiments, the hierarchical semantic grouping system analyzes a raster image to determine or extract a set of masks for objects in the raster image. For example, the hierarchical semantic grouping system employs a semantic object segmentation model (e.g., a deep neural network) to determine detailed segments within a source raster image. In particular, in some embodiments, the hierarchical semantic grouping system utilizes the semantic object segmentation model to generate object masks that delineate semantic objects and/or identifiable portions of the objects within the image.

In certain embodiments, the hierarchical semantic grouping system generates a hierarchical semantic structure for the object masks. For example, to generate the hierarchical semantic structure, the hierarchical semantic grouping system determines a partial order among the set of masks. As part of determining a partial order, in one or more embodiments, the hierarchical semantic grouping system performs pairwise comparisons between pairs of masks to evaluate their overlap. Based on the outcomes of the pairwise comparisons, in some cases, the hierarchical semantic grouping system determines the extent of overlap among the set of masks. In some embodiments, the hierarchical semantic grouping system uses determined overlaps to define a collection of directed trees (e.g., forming the basis of a hierarchical semantic structure) that captures the semantic relationships and hierarchy among the objects present in the image. For example, the hierarchical semantic grouping system arranges nodes in a hierarchical, nested fashion where each node corresponds to an object or mask identified from the raster image.

Furthermore, in one or more embodiments, the hierarchical semantic grouping system utilizes the hierarchical semantic structure or grouping to organize a set of vector paths traced from the raster image. For example, the hierarchical semantic grouping system uses a vector region segmentation model (e.g., a neural network) to extract vector paths in regions across the raster image. In some embodiments, the hierarchical semantic grouping system further modifies the mask-based hierarchical semantic structure by mapping vector regions to nodes representing the generated masks. For example, the hierarchical semantic grouping system assigns a vector region to a node based on an intersection or an overlap between the region and the node. In some cases, the hierarchical semantic grouping system maps the region to the appropriate node by determining extents to which the region overlaps with various nodes and identifying a node where the overlap falls below a threshold.

Based on mapping the vector regions to the nodes, in certain embodiments, the hierarchical semantic grouping system generates a vector image from the original raster image. For example, the hierarchical semantic grouping system generates a vector image that incorporates and is based on a geometry or structure defined by the hierarchical semantic grouping of the vector regions. In some cases, based on mapping vector regions to nodes of a semantic tree, the hierarchical semantic grouping system provides an improved user interface. For example, the hierarchical semantic grouping system provides a vector hierarchy interface that depicts a hierarchical arrangement of the vector regions, with certain nodes and regions nested inside other nodes and regions according to the hierarchical semantic structure.

As mentioned above, conventional systems have a number of technical shortcomings with regard to accuracy, functionality, and operational efficiency when converting raster images into corresponding vector images. For example, many existing vectorization systems are functionally inefficient due to their non-hierarchical organization (or their lack of organization altogether). Specifically, existing vectorization systems typically generate an unstructured (e.g., flat) array of vector paths when converting raster images into vector images. As a result, when selecting and modifying related vector content, existing vectorization systems require many client device interactions to individually select and edit related segments of a vector image. As the volume of vector paths grows, the rudimentary flat organizational structure of existing vectorization systems demands even more client device input, significantly increasing the number of user interactions required to manage and manipulate the vector content effectively.

In addition, the flat geometrical representation generated by existing vectorization systems fails to accurately preserve or represent the correlation between raster image content. As indicated, many existing vectorization systems convert raster images into essentially flat geometrical structures which provide no relational or contextual information among vector paths. By disregarding both semantic groupings and a logical organization, these existing vectorization systems generate inaccurate vectorized versions of raster images that might otherwise include or depict content in separate layers (e.g., foreground, background, and/or object-specific layers). Indeed, the final vectorized images of existing vectorization systems inadequately capture, or in many cases remove entirely, the relationships inherent in the original raster image, leading to the loss of important visual information and context.

As suggested above, embodiments of the hierarchical semantic grouping system provide a variety of advantages over conventional vectorization systems. For example, the hierarchical semantic grouping system enhances functional efficiency by incorporating a hierarchical semantic structure for vector paths. To illustrate, the hierarchical semantic grouping system simplifies client device interaction with vector content by generating a nested hierarchy where client devices select and modify semantically related segments with reduced client device interactions. In certain embodiments, in contrast to the unorganized structure generated by existing vectorization systems, the hierarchical semantic grouping system automatically groups related vector paths using a hierarchical semantic structure during the conversion process from raster to vector images. By using this hierarchical semantic structure, in certain embodiments, the hierarchical semantic grouping system selects individual vector paths or groups of vector paths corresponding to a node (and/or child nodes of the node), thereby reducing client device interactions streamlining the editing process used for consistent modifications to related vector content.

In addition, one or more embodiments of the hierarchical semantic grouping system address limitations of existing vectorization systems by accurately preserving and representing the correlations within raster image content. Unlike existing vector conversion tools that produce flat geometrical representations, in certain embodiments, the hierarchical semantic grouping system organizes vector content based on semantic groupings and a logical hierarchy. For instance, when converting raster images, the hierarchical semantic grouping system identifies and maintains the relationships between objects, ensuring that the vector paths are organized in a hierarchical semantic structure based on semantic groups. In this way, the hierarchical semantic grouping system provides a more accurate method for reflecting the relationships within the raster image and grouping vector paths that are semantically related. In certain embodiments, the hierarchical semantic grouping system facilitates iterative design by accurately reflecting the hierarchical semantic structure using a vector hierarchy interface with the vector paths grouped in layers.

Additional detail regarding the hierarchical semantic grouping system will now be provided with reference to the figures. For example, FIG. 1 illustrates a schematic diagram of an exemplary system environment ("environment") 100 in which a hierarchical semantic grouping system 106 operates. As illustrated in FIG. 1, the environment 100 includes server device(s) 102, a network 108, and client device(s) 110.

Although the environment 100 of FIG. 1 is depicted as having a particular number of components, the environment 100 is capable of having any number of additional or alternative components (e.g., any number of servers, client devices, or other components in communication with the hierarchical semantic grouping system 106 via the network 108). Similarly, although FIG. 1 illustrates a particular arrangement of the server device(s) 102, the network 108, and client device(s) 110, various additional arrangements are possible.

The server device(s) 102, the network 108, and client device(s) 110 are communicatively coupled with each other either directly or indirectly (e.g., through the network 108 discussed in greater detail below in relation to FIG. 10). Moreover, the server device(s) 102 and client device(s) 110 include one of a variety of computing devices (including one or more computing devices as discussed in greater detail with relation to FIG. 10).

As illustrated in FIG. 1, the environment 100 includes the server device(s) 102 and digital design system 104. The server device(s) 102 utilizes the digital design system 104 to generate, track, store, process, receive, and transmit electronic data, including images, masks, regions, and vector paths. For example, the server device(s) 102 receives or monitors interactions across the client device(s) 110. In some embodiments, the server device(s) 102 transmits content to the client device(s) 110 to cause the client device(s) 110 to display content associated with vector paths. For example, the server device(s) 102 presents an image and vector paths to client device(s) 110 and displays image vector paths on the client device(s) 110 with the image and vector paths displayed corresponding to system need (e.g., by providing a vector path for display via client application(s) 112).

Additionally, the server device(s) 102 includes all, or a portion of, the hierarchical semantic grouping system 106. For example, the hierarchical semantic grouping system 106 operates on the server device(s) 102 to access digital content (including images, masks, regions, and/or vector paths), determine digital content changes, and provide localization of content changes to the client device(s) 110. In one or more embodiments, via the server device(s) 102, the hierarchical semantic grouping system 106 generates and displays images, masks, regions, and/or vector paths based on the client device(s) 110 input. Example components of the hierarchical semantic grouping system 106 will be described below with reference to FIG. 10.

Furthermore, as shown in FIG. 1, the illustrated system includes the client device(s) 110. In some embodiments, the client device(s) 110 include, but are not limited to, mobile devices (e.g., smartphones, tablets), laptop computers, desktop computers, or another type of computing devices, including those explained below in reference to FIG. 10. Some embodiments of client device(s) 110 are operated by a user to perform a variety of functions via respective client application(s) 112 such as the generation and modification of vector paths. The client device(s) 110 include one or more applications (e.g., the client application(s) 112) that access, edit, modify, store, and/or provide, for display, digital image content. For example, in some embodiments, the client application(s) 112 include a software application installed on the client device(s) 110. In other cases, however, the client application(s) 112 include a web browser or other application that accesses a software application hosted on the server device(s) 102.

In one or more embodiments, the hierarchical semantic grouping system 106 is implemented in whole, or in part, by the individual elements of the environment 100. Indeed, as shown in FIG. 1, the hierarchical semantic grouping system 106 is implemented with regard to the server device(s) 102 and the client device(s) 110. In particular embodiments, the hierarchical semantic grouping system 106 on the client device(s) 110 comprises a web application, a native application installed on the client device(s) 110 (e.g., a mobile application, a desktop application, a plug-in application, etc.), or a cloud-based application where part of the functionality is performed by the server device(s) 102.

In additional or alternative embodiments, the hierarchical semantic grouping system 106 on the client device(s) 110 represents and/or provides the same or similar functionality as described herein in connection with the hierarchical semantic grouping system 106 on the server device(s) 102. In some embodiments, the hierarchical semantic grouping system 106 on the server device(s) 102 supports the hierarchical semantic grouping system 106 on the client device(s) 110.

In some embodiments, the hierarchical semantic grouping system 106 includes a web hosting application that allows the client device(s) 110 to interact with content and services hosted on the server device(s) 102. To illustrate, in one or more embodiments, the client device(s) 110 accesses a web page or computing application supported by the server device(s) 102. The client device(s) 110 provides input to the server device(s) 102 (e.g., selected content items). In response, the hierarchical semantic grouping system 106 on the server device(s) 102 generates/modifies digital content. The server device(s) 102 then provides the digital content to the client device(s) 110.

In another embodiment, the hierarchical semantic grouping system 106 on the server device(s) 102 supports the hierarchical semantic grouping system 106 on the client device(s) 110. For instance, in some cases, the hierarchical semantic grouping system 106 on the server device(s) 102 generates or learns parameters for one or more machine learning models (e.g., semantic object segmentation model 120 and/or a vector region segmentation model 122). The hierarchical semantic grouping system 106 then, via the server device(s) 102, provides the one or more trained machine learning models to the client device(s) 110. In other words, the client device(s) 110 obtains (e.g., downloads) the one or more machine learning models (e.g., with any learned parameters) from the server device(s) 102. Once downloaded, the one or more machine learning models on the client device(s) 110 utilizes the one or more trained machine learning models to generate vector paths independent from the server device(s) 102.

In some embodiments, though not illustrated in FIG. 1, the environment 100 has a different arrangement of components and/or has a different number or set of components altogether. For example, in certain embodiments, the client device(s) 110 communicate directly with the server device(s) 102, bypassing the network 108. As another example, the environment 100 includes a third-party server comprising a content server and/or a data collection server.

Figure 2:
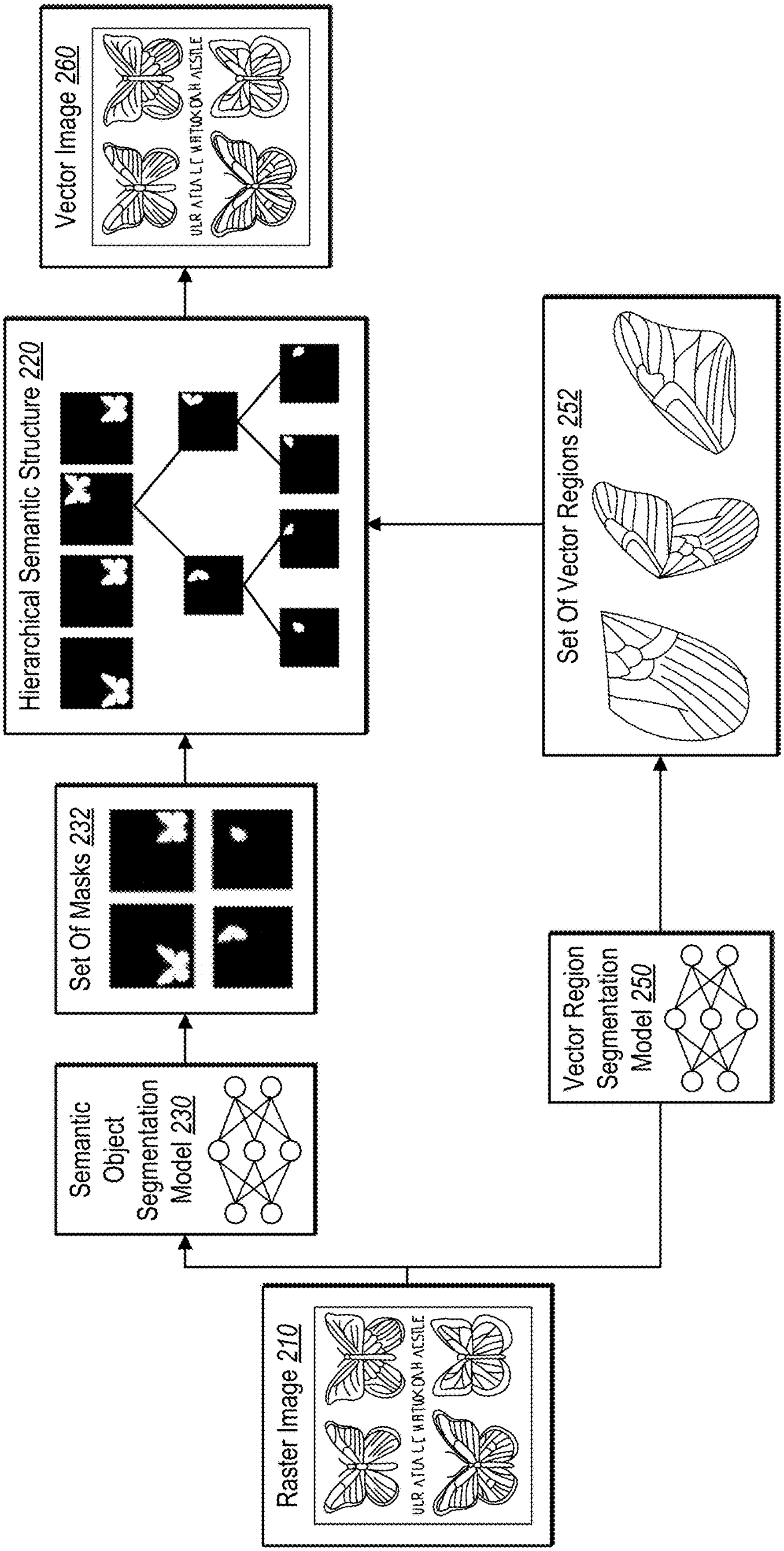
FIG. 2 illustrates an example overview of mapping vector regions to a hierarchical semantic structure in accordance with one or more embodiments.

As previously mentioned, in one or more embodiments, the hierarchical semantic grouping system 106 generates digital design content including vector paths organized utilizing a hierarchical semantic structure. For instance, FIG. 2 illustrates an example overview of mapping vector regions to a hierarchical semantic structure in accordance with one or more embodiments. Additional detail regarding the various acts of FIG. 2 is provided thereafter with reference to subsequent figures.

As shown in FIG. 2, the hierarchical semantic grouping system 106 generates a vector image 260 comprising vector paths utilizing the disclosed methods. In particular, in one or more embodiments, the hierarchical semantic grouping system 106 receives or determines a raster image 210 (e.g., through a client device interaction). For example, the raster image 210 includes an image made up of pixels such as a JPEG, GIF, or PNG. As shown, the raster image 210 contains one or more identifiable objects or elements. For example, the raster image 210 contains semantic objects that can be distinctly identified. Semantic objects include, but are not limited to, groups of pixels depicting content labeled or classified as people, animals, buildings, books, tools, and/or symbols.

As further shown, in one or more embodiments, the hierarchical semantic grouping system 106 partitions the raster image 210 into a set of masks 232 utilizing a semantic object segmentation model 230. For example, in one or more embodiments, the hierarchical semantic grouping system 106 utilizes a segmentation neural network to generate the set of masks 232. For example, the hierarchical semantic grouping system 106 utilizes a salient object segmentation neural network, such as that described by Pao et al. in U.S. patent application Ser. No. 15/967,928 filed on May 1, 2018, entitled ITERATIVELY APPLYING NEURAL NETWORKS TO AUTOMATICALLY IDENTIFY PIXELS OF SALIENT OBJECTS PORTRAYED IN DIGITAL IMAGES, the contents of which are expressly incorporated herein by reference in their entirety. In another embodiment, the hierarchical semantic grouping system 106 utilizes an image mask generation system, such as that described by Zhang et al. in U.S. patent application Ser. No. 16/988,055 filed on Aug. 7, 2020, entitled GENERATING AN IMAGE MASK FOR A DIGITAL IMAGE BY UTILIZING A MULTI-BRANCH MASKING PIPELINE WITH NEURAL NETWORKS, the contents of which are expressly incorporated herein by reference in their entirety. In yet another embodiment, the hierarchical semantic grouping system 106 utilizes a multi-model object selection system, such as that described by Price et al. in U.S. Patent Application Publication No. 2019/0236394 filed on Apr. 5, 2019, entitled UTILIZING INTERACTIVE DEEP LEARNING TO SELECT OBJECTS IN DIGITAL VISUAL MEDIA, the contents of which are expressly incorporated herein by reference in their entirety.

In particular, the semantic object segmentation model 230 (e.g., a deep neural network) processes the raster image 210 to identify objects (and visually distinct/identifiable portions of objects) within the raster image 210 and generates the set of masks 232 corresponding to the objects. To illustrate, the hierarchical semantic grouping system 106 utilizes the semantic object segmentation model 230 to classify each pixel in the raster image 210 as belonging to either an object or the background. Furthermore, the semantic object segmentation model 230 generates one or more object masks (e.g., the set of masks 232) where each object mask delineates the boundary of an object within the raster image 210.

As further shown, the hierarchical semantic grouping system 106 generates a hierarchical semantic structure 220 from the set of masks 232. In particular, the hierarchical semantic grouping system 106 generates the hierarchical semantic structure 220 by performing pairwise comparisons between pairs of masks from the set of masks 232. Based on the outcomes of the pairwise comparisons, the hierarchical semantic grouping system 106 determines an extent of overlap between the masks of the set of masks 232. The hierarchical semantic grouping system 106 further utilizes the extent of overlap between the masks to define a collection of directed trees (e.g., the hierarchical semantic structure 220) that captures the hierarchical semantic relationships among the set of masks 232. The hierarchical semantic grouping system 106 arranges the set of masks 232 in the framework based on the hierarchical semantic relationships derived from the overlaps.

As further shown, the hierarchical semantic grouping system 106 maps vector regions to the hierarchical semantic structure 220. In particular, the hierarchical semantic grouping system 106 uses a utilizes a vector region segmentation model 250 to segment the raster image into a set of vector regions 252 for vectorization. The hierarchical semantic grouping system 106 maps the vector regions to the hierarchical semantic structure 220 by assigning the set of vector regions 252 to the nodes in the hierarchical semantic structure 220. In some embodiments, the hierarchical semantic grouping system 106 assigns the set of vector regions 252 to nodes (and the corresponding masks) that overlap the set of vector regions 252 and satisfy an intersection threshold. For example, the vector region segmentation model 250 is a solid image segmentation model, such as that described by Souymodip Chakraborty, Vineet Batra, Matthew Fisher, Ankit Phogat, Vishwas Jain, and Jaswant Singh Ranawat in U.S. patent application Ser. No. 18/436,578 titled SEGMENTING IMAGES FOR VECTOR GRAPHICS RECONSTRUCTION, filed Feb. 8, 2024, which is hereby incorporated by reference in its entirety. In some embodiments, the vector region segmentation model 250 is a salient object segmentation neural network, such as that described by Pao et al. in U.S. patent application Ser. No. 15/967,928, the contents of which have been previously incorporated herein by reference in their entirety.

Furthermore, in certain embodiments, the hierarchical semantic grouping system 106 generates the vector image 260. As shown, the hierarchical semantic grouping system 106 generates a vector image 260 with vector paths that are arranged, layered, and/or structured according to semantic groups of the hierarchical semantic structure 220. Furthermore, in certain embodiments, the hierarchical semantic grouping system 106 provides a vector hierarchy interface on the client device for interacting with the vector paths in conjunction with the vector image 260.

Figure 3:
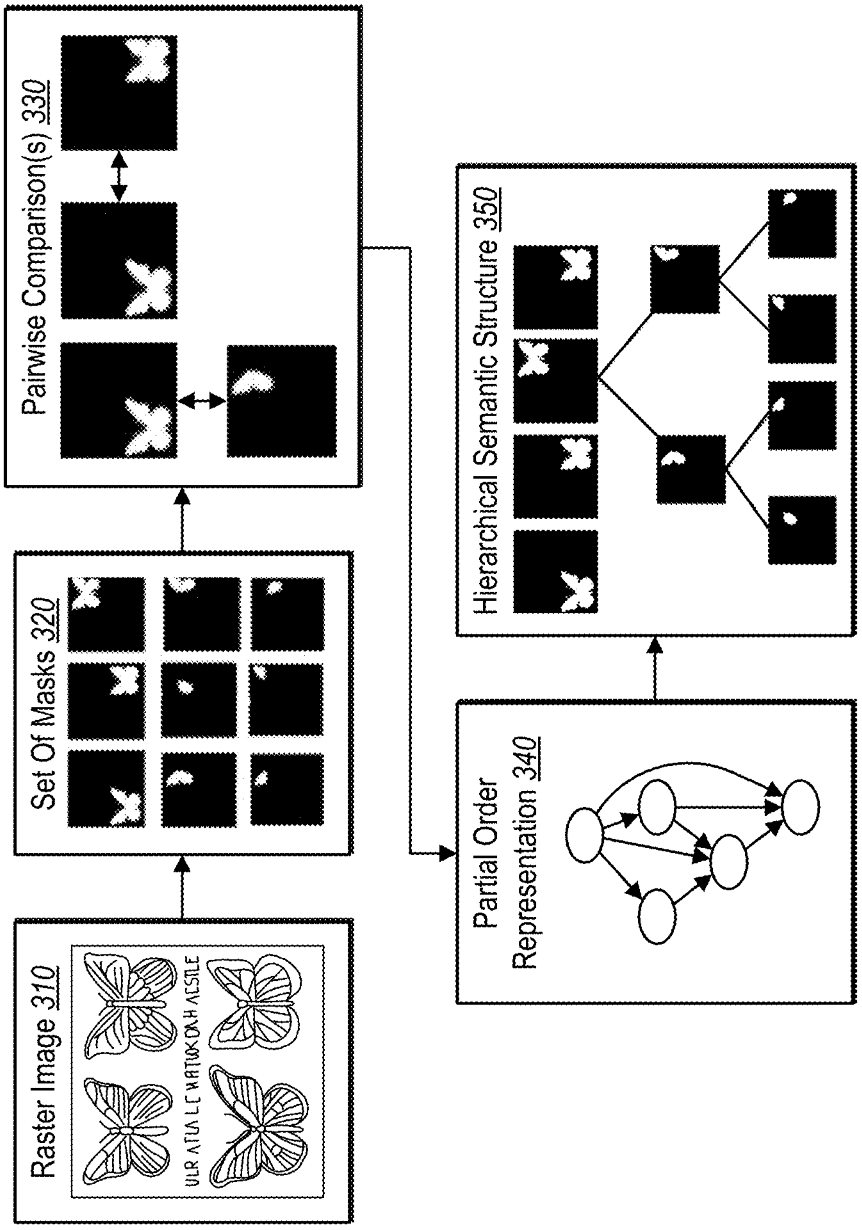
FIG. 3 illustrates an example of generating a hierarchical semantic structure for a set of masks generated from a raster image in accordance with one or more embodiments.

As mentioned in relation to FIG. 2, the hierarchical semantic grouping system 106 segments the pixels within a raster image utilizing one or more models. For example, the hierarchical semantic grouping system 106 utilizes a semantic object segmentation model to generate a set of masks associated with semantic objects within the raster image and a vector region segmentation model to segment the raster image into a set of regions for vectorization. FIG. 3 illustrates an example of generating a hierarchical semantic structure for a set of masks generated from a raster image utilizing a semantic object segmentation model in accordance with one or more embodiments.

As shown in FIG. 3, the hierarchical semantic grouping system 106 receives and/or determines a raster image 310. In one or more embodiments, the raster image 310 is a 2-dimensional array of pixels, where each pixel has three color channels (e.g., red, blue, and green). For example, the raster image 310 includes an image with height $H \in \mathbb{N}$ and width $W \in \mathbb{N}$ where a pixel is uniquely identified by its position in the 2-dimensional grid. In certain embodiments, the set of pixels $P_I$ is defined as, $P_I := [0 \ldots N) \times [0 \ldots W)$ where the set $P_I$ is a strict subset of $\mathbb{R}^2$. Thus, the raster image 310 is a map from the set of pixels to colors, $I: P_I \rightarrow \mathbb{R}^3$.

In certain embodiments, the hierarchical semantic grouping system 106, as part of generating a hierarchical semantic structure 350, the hierarchical semantic grouping system 106 generates a set of masks 320 from the raster image 310. In particular, the hierarchical semantic grouping system 106 defines a set S as a collection of objects or masks. The size of S is defined as $|S|$. A relation R on the set S is defined as a subset of $S \times S$. In one or more embodiments, the hierarchical semantic grouping system 106 determines a partial order on S.

Definition 1: A partial order on S is a relation which is reflexive, anti-symmetric and transitive. A partition of a set S is collection of non-overlapping subset of S, such that the union of all subsets in the partition is the set S. A function is injective if $\forall_{a \in A} |\{(a, b): (a, b) \in f\}| = 1$.

As defined, the hierarchical semantic grouping system 106 determines a partial order on S, a partition of a set S, and a relation between two sets A and B. In particular, the function $f$ is injective, requiring each element of A is associated with exactly one unique element of B.

Furthermore, the hierarchical semantic grouping system 106 determines how an injective function $f$ is used to construct an equivalence relation on its domain as follows:

Definition 2: Every injective function $f$: A→B, induces an equivalence relation on A:

$$(a, b) \in \sim f \text{ iff } f(a) = f(b)$$

The resulting quotient set A\$f$ lifts $f$ to a bijection.

$$f(S) \in B \text{ where } S \in A/f$$

The hierarchical semantic grouping system 106 connects the partial order on the set S to a collection of trees in a forest F. The hierarchical semantic grouping system 106 further defines the partial order on the set S and identifies the raster image 310 as follows:

Definition 3: A partial order $\preceq$ on a set S is a relation that is reflexive, anti-symmetric and transitive. A partial order induces a forest F, which is a collection of trees, where each node is an element of S and there is an edge from a to b in some tree of the forest iff $a \preceq b$.

A raster image is a two 2-dimensional array of pixels, where each pixel has 3 channel colors, namely red, blue, and green. Consider an image with height $H \in \mathbb{N}$ and width $W \in \mathbb{N}$. The hierarchical semantic grouping system 106 identifies each pixel uniquely by its position in the 2-dimensional grid. The hierarchical semantic grouping system 106 defines the set of pixels $P_I$ as, $$P_I := [0 \ldots N) x [0 \ldots W)$$

The set $P_I$ is a strict subset of $\mathbb{R}^2$. Thus, an image is a map from pixel to a color shown by:

$$I : P_I \to \mathbb{R}^3$$

The hierarchical semantic grouping system 106 defines a segmentation of the raster image 310 as a mapping of the set of pixels $P_I$ in the raster image 310 to natural numbers. In particular, the mapping specifies that each pixel in the image is assigned a specific natural number, or segment id, as follows:

Definition 4: The hierarchical semantic grouping system 106 defines the segmentation of an image as a map from pixels to natural numbers:

$$S_I : P_I \to \mathbb{N}$$

That is, the hierarchical semantic grouping system 106 assigns every pixel a non-negative number, called a segment id.

The hierarchical semantic grouping system 106 defines the relationship between the segmentation of the raster image 310 and the resulting partition of pixels based on the segment ids assigned during the segmentation process as follows:

Definition 5: The hierarchical semantic grouping system 106 defines the partition $P_t$ of the pixels induced by the segmentation as the equivalence class defined by the equivalence relation where they have the same segment id.

$$P_t := \{\{p \in P_I : S(p) = n\} : n \in \mathbb{N}\}^2$$

As defined by the hierarchical semantic grouping system 106, S and $P_t$ are equivalent, that is, S can be derived from $P_t$ and vice versa (e.g., a segmentation signifies both the map and the corresponding partition).

In particular, the hierarchical semantic grouping system 106 utilizes two types of collections of sets of pixels. The first collection of the sets of pixels is a semantic object segmentation obtained from a semantic object segmentation model. The first collection is denoted as M and is a set of masks composed of binary images that identify parts of the raster image. The second collection of the sets of pixels is an image segmentation obtained from a vector region segmentation model for the purpose of vectorization and is denoted as S. Each element of the second collection is a region that represents a coherent group of pixels that can be treated as a single object in the vectorization process. The set of regions is a partition of the pixels of the raster image.

Furthermore, the hierarchical semantic grouping system 106 determines a hierarchical grouping of the set S, which is visualized as a forest F created based on a partial order defined on the power set $2^S$ of S (e.g., all possible subsets of S, including the empty set and S). The forest F is a collection of trees and each tree in the forest is formed by subsets of S that are related by the subset partial order. The hierarchical semantic grouping system 106 defines this as follows:

Definition 6: The hierarchical semantic grouping system 106 defines a hierarchical grouping of a set S as a forest induced by the partial order on the power set $2^S$ where the set of nodes is a partition of S.

Turning back to FIG. 3, as shown, the hierarchical semantic grouping system 106 generates the set of masks 320. In particular, the hierarchical semantic grouping system 106 utilizes a semantic object segmentation model to generate the set of masks $M := \{m_1, \ldots, m_n\}$, where each mask m defines a semantic object inside the image. To illustrate, the semantic object segmentation model classifies each pixel of the set of pixels $P_I$ in the raster image 210 as belonging to either a semantic object or the background. In particular, the semantic object segmentation model identifies semantic objects at different levels of granularity where some identified objects are part of other objects (e.g., where object pixels overlap and/or are enclosed by other objects). Furthermore, the semantic object segmentation model generates one or more object masks where each object mask delineates the boundary of a semantic object within the raster image 310. In addition, the hierarchical semantic grouping system 106 performs pre-processing steps by removing duplicate vector masks, reducing noise in the vector masks, and filling holes in the vector masks.

As shown, the hierarchical semantic grouping system 106 performs pairwise comparison(s) 330 between pairs of masks in the set of masks 320 to generate the hierarchical semantic structure 350. In particular, the hierarchical semantic grouping system 106 performs a pairwise comparison for a pair of masks of the set of masks 320 to determine an overlap between them. For example, the hierarchical semantic grouping system 106 determines an overlap as an area or an amount of pixels shared by two objects in a mask pair. The hierarchical semantic grouping system 106 thus performs the pairwise comparison(s) 330 between a pair of masks (e.g., a first mask and a second mask) of the set of masks 320 and repeats for each possible pair of masks.

Moreover, the hierarchical semantic grouping system 106 generates the hierarchical semantic structure 350 based on relative amounts of overlaps among the pairwise overlaps for the pairs of nodes. To illustrate, the hierarchical semantic grouping system 106 generates the hierarchical semantic structure 350 as a hierarchical tree with parent nodes and child nodes. The hierarchical semantic grouping system 106 generates the tree based on measures of overlap (e.g., using pairwise comparison(s) 330) for the pairs of masks/objects in the set of masks 320. To generate the hierarchical semantic structure 350, the hierarchical semantic grouping system 106 test determines a parent-child node relationship where there is at least a threshold amount/area of overlap. Indeed, in some cases, child nodes have at least a threshold overlap with a parent node. As part of coming up with the tree, the hierarchical semantic grouping system 106 also determines independent node pairs that have no overlap or fall below a threshold overlap with each other and places the independent node pairs on separate branches (e.g., node pairs that do not branch from one another and thus have no parent-child relationship). In some cases, the hierarchical semantic grouping system 106 places a node for a mask inside the smallest mask which has the highest intersection.

In certain embodiments, the hierarchical semantic grouping system 106 calculates the overlap between the pairs of masks as follows:

Definition 7: Given an intersection threshold θ, let R be a relation on M.

$$(m, m') \in R \text{ iff } |m|<|m'| \text{ and } \frac{|m \cap m'|}{|m \cup m'|} \geq \theta$$

As defined, the hierarchical semantic grouping system 106 determines the hierarchical semantic structure (e.g., relation R) by determining an area of the first mask (e.g., first node) is less than an area of the second mask (e.g., second node). Furthermore, the hierarchical semantic grouping system 106 determines the intersections of the masks by determining that a ratio of a pairwise overlap for the first mask with the second mask and a combined area of the first mask with the second mask is more than the intersection threshold θ. As shown, the hierarchical semantic grouping system 106 determines the intersection between a pair of masks based on an amount of overlap between the first mask and the second mask (and not a fixed threshold value). Specifically, the hierarchical semantic grouping system 106 determines the intersection as a ratio of an overlapping area of the first mask and the second mask and a combined area of the first mask and the second mask. In some cases, the overlap is the Boolean AND operation between two masks, and the ratio of intersection over union as an overlap measure allows adaptability across different mask pairings.

As further shown, the hierarchical semantic grouping system 106 generates a partial order representation 340 for the set of masks 320. In particular, the hierarchical semantic grouping system 106 determines a first position in the hierarchical semantic structure for a first mask and a second position in the hierarchical semantic structure for a second mask based on a comparison of the intersection to the intersection threshold θ. In one or more embodiments, the hierarchical semantic grouping system 106 determines the partial order representation 340 based on:

Definition 8: The relation $\preceq_\theta$ is defined as the transitive closure of R.

Lemma 1: Relation $\preceq_\theta \subseteq M \times M$ is a partial order.

Proof: R is reflexive and anti-symmetric, and hence its transitive closure, $\preceq_\theta$ satisfies all the axioms of the partial order. The partial order $\preceq_\theta$ defines a forest F, a collection of directed trees, yielding the hierarchical grouping of masks. An extra node represents mask m* as the entire image.

As further shown in FIG. 3, the hierarchical semantic grouping system 106 generates the hierarchical semantic structure 350. In particular, the hierarchical semantic grouping system 106 generates hierarchical layers by determining semantic relationships among the objects within the raster image. For example, the hierarchical semantic grouping system 106 generates the hierarchical semantic structure 350 based on the partial order representation 340 for the set of masks. To illustrate, as defined above, the hierarchical semantic grouping system 106 utilizes a partial order representation 340 (e.g., partial order $\preceq_\theta$) that defines a collection of directed trees of a forest F, yielding a hierarchical grouping of masks. Each node of a tree of forest F is equivalently a mask and the tree structure captures the semantic hierarchy of objects present in the image utilizing the hierarchical semantic structure 350.

Figure 4:
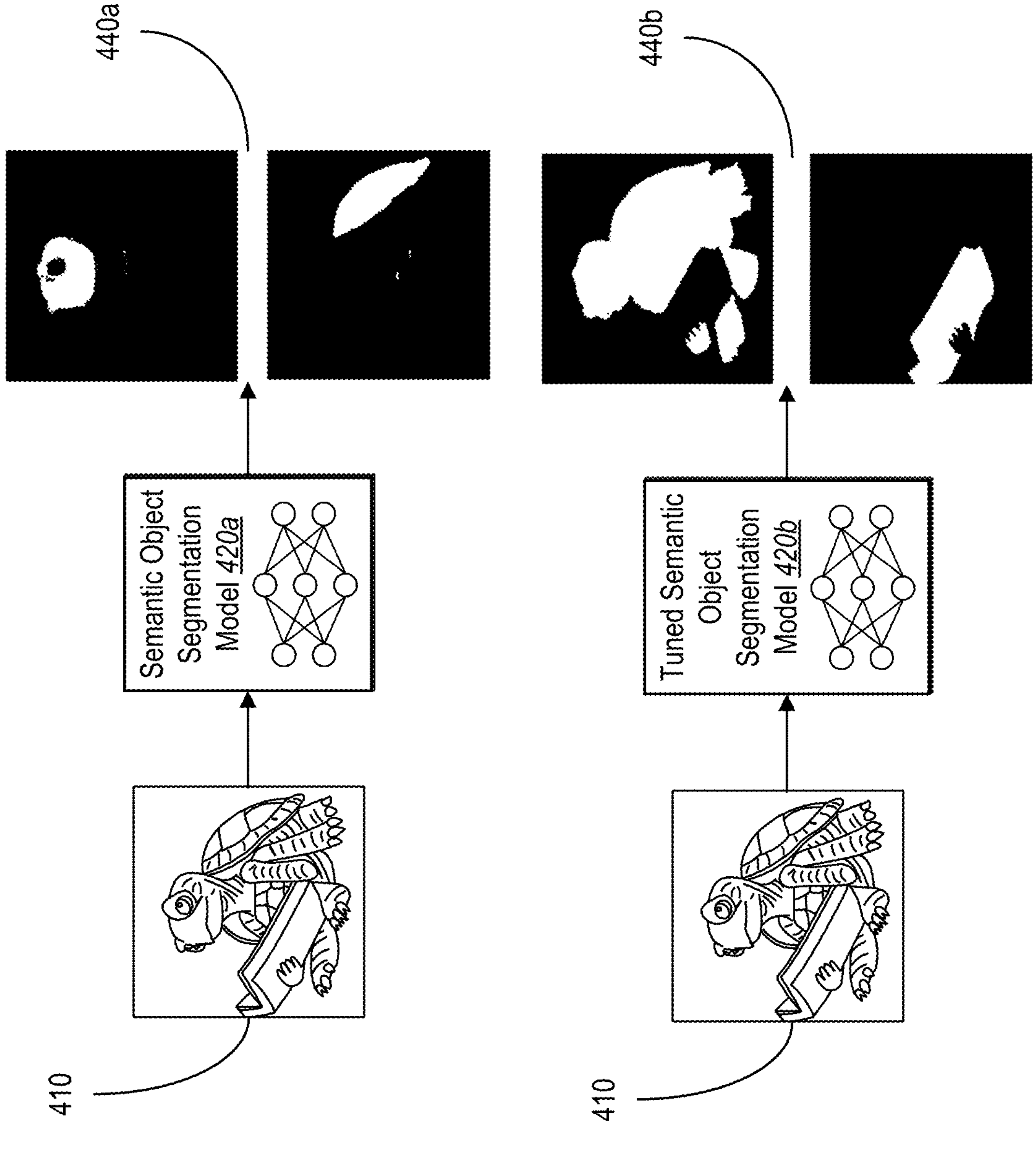
FIG. 4 illustrates an example of fine-tuning a semantic object segmentation model in accordance with one or more embodiments.

As mentioned, the hierarchical semantic grouping system 106 utilizes a semantic object segmentation model to generate the set of masks from the raster image. FIG. 4 illustrates an example of fine-tuning a semantic object segmentation model in accordance with one or more embodiments.

As shown in FIG. 4, the hierarchical semantic grouping system 106 tunes the semantic object segmentation model 420*a* to obtain the semantic object segmentation model 420*b*. Indeed, the hierarchical semantic grouping system 106 utilizes the semantic object segmentation model 420*b* to overcome domain gap issues and to generate more precise object masks (as shown by the set of object masks 440*b* in comparison to the set of object masks 440*a*). In one or more embodiments, the semantic object segmentation model 420*a* (and semantic object segmentation model 420*b*) is a machine learning model (e.g., a neural network) or a collection of machine learning models designed for semantic segmentation tasks (e.g., partitioning an image into multiple segments).

In certain embodiments, a machine learning model includes or refers to a computer algorithm or a collection of computer algorithms that automatically improve for a particular task through iterative outputs or predictions based on the use of data. For example, a machine learning model utilizes one or more learning techniques to improve accuracy and/or effectiveness via training data and one or more loss functions. Along these lines, a neural network includes or refers to a machine learning model that is trained and/or tuned based on inputs to determine digital content items, key elements, or approximate unknown functions. For example, a neural network includes a model of interconnected artificial neurons (e.g., organized in layers) that communicate and learn to approximate complex functions and generate outputs (e.g., image segments) based on a plurality of inputs provided to the neural network. In some cases, a neural network refers to an algorithm (or set of algorithms) that implement deep learning techniques to model high-level abstractions in data. In certain embodiments, a neural network includes various layers, such as an input layer, one or more hidden layers, and an output layer that each perform tasks for processing data. For example, a neural network includes a deep neural network, a convolutional neural network, a transformer neural network, a diffusion neural network, a recurrent neural network (e.g., an LSTM), a graph neural network, or a generative adversarial neural network.

In particular, the hierarchical semantic grouping system 106 utilizes the semantic object segmentation model 420*b* (e.g., one or more deep neural network) to delineate semantic objects within the raster image 410. To illustrate, the semantic object segmentation model 420*b* classifies each pixel in the raster image 410 as belonging to a semantic object or the background. Further, the semantic object segmentation model 420*b* generates a set of object masks corresponding to the semantic objects within the raster image 410, where each of the set of object masks delineates the boundary of a semantic object detected by the semantic object segmentation model 420*b*.

In one or more embodiments, the hierarchical semantic grouping system 106 fine-tunes the semantic object segmentation model by tuning model parameters. In particular, rather than employing a generic grid search technique for parameter tuning, the hierarchical semantic grouping system 106 tunes targeted parameters to optimize the generation of the set of masks. To illustrate, the hierarchical semantic grouping system 106 tunes the semantic object segmentation model 420*a* (which generates the set of object masks 440*a*) and utilizes a tuned version represented by the semantic object segmentation model 420*b* to generate the set of object masks 440*b*. In addition, the hierarchical semantic grouping system 106 tunes the semantic object segmentation model to filter the set of masks by removing duplicate masks within the set of masks, reducing noise within the set of masks, and/or filling holes within the set of masks.

In particular, in certain embodiments, the hierarchical semantic grouping system 106 fine-tunes the semantic object segmentation model 420*b* by adjusting a parameter representing the number of points to be sampled along a side of the raster image (e.g., point_per_side). Using the semantic object segmentation model 420*b*, the hierarchical semantic grouping system 106 generates, based on the adjusted parameter, the set of object masks 440*b* by segmenting the raster image into masks that isolate and represent objects within the raster image. In one or more embodiments, to both generate larger masks that correspond to semantic objects and smaller masks that capture meaningful details of the semantic objects, the hierarchical semantic grouping system 106 decreases the point per side an amount of 2 (e.g., from 32 to 30) to increase the spacing between the points.

Relatedly, in some embodiments, the hierarchical semantic grouping system 106 fine-tunes the semantic object segmentation model 420*b* by adjusting a parameter representing a filtering threshold (e.g., pred_iou_thresh). For example, the hierarchical semantic grouping system 106 increases the filtering threshold (e.g., [0,1]) to suppress redundant and duplicate masks for the set of object masks 440*b*. For example, by increasing the filtering threshold, the semantic object segmentation model 420*b* increases the number of distinct masks being generated (e.g., not combined). In certain embodiments, the hierarchical semantic grouping system 106 adjusts the filtering threshold based on the predicted mask quality.

In one or more embodiments, the hierarchical semantic grouping system 106 fine-tunes the semantic object segmentation model 420*b* by adjusting a parameter for a stability score threshold (e.g., stability_score_thresh). For example, the hierarchical semantic grouping system 106 utilizes the stability score threshold to filter masks based on comparing the overlap (e.g., area of overlap to total area ratio) between masks within the set of object masks 440*b*. To illustrate, the hierarchical semantic grouping system 106 filters masks by thresholding the overlap of predicted mask logits at high and low values. In certain embodiments, the hierarchical semantic grouping system 106 decreases the bound for a stability score parameter (e.g., from 0.95 to 0.85) to generate the set of object masks 440*b*.

In some embodiments, the hierarchical semantic grouping system 106 fine-tunes the semantic object segmentation model 420*b* by adjusting a parameter for the box non-maximal suppression (NMS) threshold (e.g., box_nms_thresh). In particular, the hierarchical semantic grouping system 106 utilizes the box NMS threshold as a cutoff to filter duplicate masks. In certain embodiments, the hierarchical semantic grouping system 106 increases the box NMS threshold.

Figure 5:
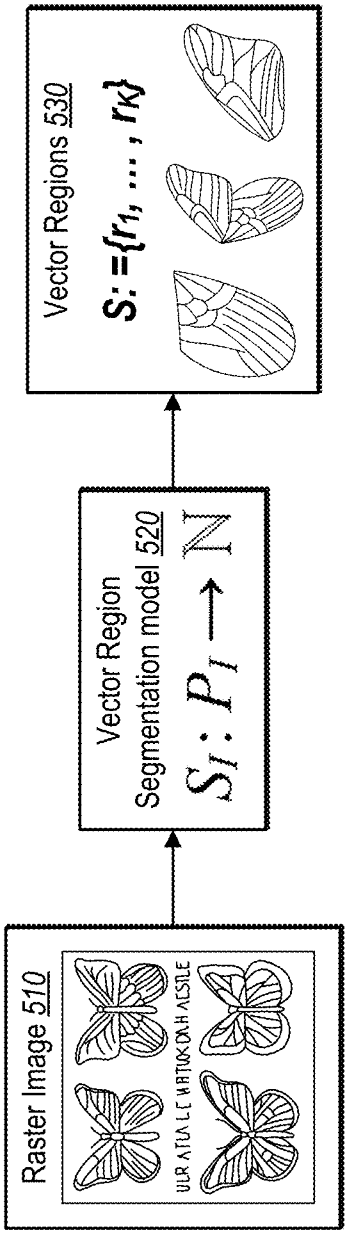
FIG. 5 illustrates an example of utilizing a vector region segmentation model to generate vector regions in accordance with one or more embodiments.

As mentioned, the hierarchical semantic grouping system 106 utilizes a vector region segmentation model to generate vector regions. FIG. 5 illustrates an example of utilizing a vector region segmentation model to generate vector regions in accordance with one or more embodiments.

As described in relation to FIG. 3, the hierarchical semantic grouping system 106 defines principles and concepts for segmenting the raster image. In particular, the hierarchical semantic grouping system 106 defines the raster image by mapping the pixels $P_I$ to natural number as $S_I$: $P_I \rightarrow \mathbb{N}$. The vector region segmentation model 520 partitions the raster image 510 into a set of pixels S where each vector region is distinguished by having the same segment id. In some cases, the vector region segmentation model 520 traces vector paths shown in the raster image 510, such as borders or boundaries between pixels of different colors and/or between objects or areas corresponding to different semantic labels. In this way, the vector region segmentation model 520 divides the image into discrete areas based on pixel characteristics and connectivity. For example, the vector region segmentation model 520 derives each vector region from the segmentation map (e.g., $S_I$: $P_I \rightarrow \mathbb{N}$) which assigns each pixel in the set of pixels S to a natural number n (e.g., segment id).

The set of vector regions S, which results from this segmentation, comprises vector regions 530 where each vector region contains pixels that share the same segment id. As shown, each element of the set S is a region (e.g., $S:=\{r_1, \ldots, r_k\}$). Furthermore, the vector regions 530 correspond to traced curves from the raster image 510 which include or define one or more vector paths (e.g., Bezier splines). The set of regions gives a partition of the pixels of the raster image 510.

Figure 6:
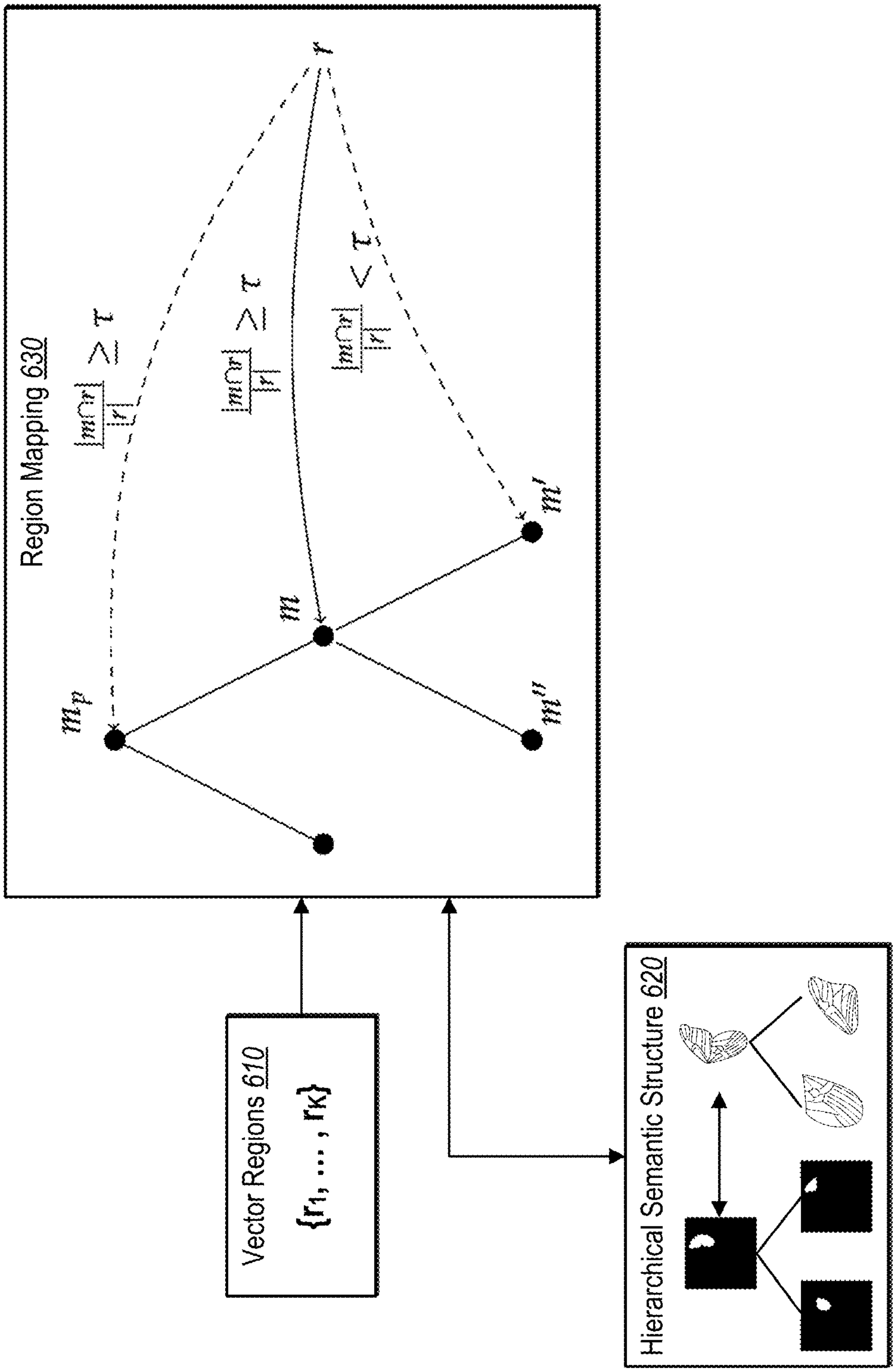
FIG. 6 illustrates an example of modifying a hierarchical semantic structure by mapping regions to nodes in accordance with one or more embodiments.

As mentioned, the hierarchical semantic grouping system 106 arranges the vector regions into logical groups. For example, the hierarchical semantic grouping system 106 maps the vector regions to a hierarchical semantic structure and arranges the vector regions into logical groups. FIG. 6 illustrates an example of modifying a hierarchical semantic structure by mapping regions to nodes in accordance with one or more embodiments.

As shown, the hierarchical semantic grouping system 106 performs a region mapping 630 to map the vector regions 610 to the hierarchical semantic structure 620. In particular, the hierarchical semantic grouping system 106 maps a vector region (of the vector regions 610) and the corresponding vector paths to a node of the hierarchical semantic structure 620 based on evaluating the intersection of the vector region with the set of nodes of the hierarchical semantic structure 620. For example, the hierarchical semantic grouping system 106 modifies the hierarchical semantic structure 620 by mapping the vector regions 610 and corresponding vector paths to the set of nodes according to intersections between the vector regions 610 and the set of nodes. Indeed, the hierarchical semantic grouping system 106 tests each Bezier curve or spline for each node or mask of the hierarchical semantic structure 620, determines nodes where the intersection or overlap falls below a threshold, and places the curves/splines at the previous node before falling below the threshold.

To illustrate, in one or more embodiments, the hierarchical semantic grouping system 106 defines $S:=\{r_1, \ldots, r_k\}$ be the set of regions of the image (e.g., vector regions 610). Furthermore, the hierarchical semantic grouping system 106 defines an injective function $f$: S→M by assigning every region in S to a node in the forest F. For fixed intersection threshold τ, the hierarchical semantic grouping system 106 defines a relation $\rho_t$: S×t for a tree t∈F as follows:

$$(r, m) \in \rho t \; iff \; \frac{|m \cap r|}{|r|} \geq \tau \text{ and } \underset{m' \preceq m}{\forall} \text{ and } \frac{|m' \cap r|}{|r|} < \tau$$

That is, if $(r,m) \in \rho_t$ then there does not exist any child node m'≤m where the size of the intersection with r is greater than t (as shown by region mapping 630). In certain embodiments, the hierarchical semantic grouping system 106 generates $\rho_t$ by searching through all regions in S for a given node m∈t. In certain embodiments, the hierarchical semantic grouping system 106 expedites the generation of $\rho_t$ by utilizing a subset of nodes within a neighborhood of a region r where $(r,m) \in \rho_t$ for the nodes in the neighborhood of m.

In certain embodiments the hierarchical semantic grouping system 106 maps the vector regions 610 to nodes of the hierarchical semantic structure 620 using a hierarchical semantic mapping function. For example, the hierarchical semantic grouping system 106 maps the vector regions 610 to nodes of the hierarchical semantic structure 620 as follows:

Definition 9: A hierarchical semantic mapping is a function $f$: S→M, which maps each vector region r to a node m in the hierarchical semantic structure F as follows:

$$f(r) := \text{argmax}(\{|m \cap r|: m \in R\}) \text{ where } R := \{m: \exists_{t \in F} (r, m) \in \rho_t\}$$

Lemma 2: The function $f(r)$ as defined in Definition 9 is injective.

Proof: As m* is present in F, the set $\{m: \varepsilon_{t\in F} (r,m) \in \rho_t\}$ is always non-empty.

Furthermore, the hierarchical semantic grouping system 106 determines that the tuple (F, $f$) induces the hierarchical semantic grouping of the segmentation S as follows:

Definition 10: Given (F, $f$), let H be the quotient set S/$f$. The partial order of H is defined:

$$R \preceq R' \; iff \; f(R) \preceq f(R')$$

Theorem 1: The forest of the partial order stated in Definition 10 defines a hierarchical grouping.

Proof: The set of nodes are a partition of S. This follows from $H \subseteq 2^S$ is a quotient set. Thus, a hierarchical structure (H, ≤) encompassing both image masks and regions is created, which is used to organize the resulting paths obtained from the vector regions into logical groups.

Turning back to FIG. 6, the hierarchical semantic grouping system 106 assigns regions (and corresponding vector paths) to nodes with the hierarchical semantic structure 620 based on the region mapping 630 as described above. To illustrate, as shown by the region mapping 630, the hierarchical semantic grouping system 106 determines a subset of nodes within a neighborhood of a region r corresponding to $m_p$, m, m', and m''. As further shown, the hierarchical semantic grouping system 106 determines an intersection threshold τ between the region r and the subset of nodes based on an amount of overlap of the region with the nodes $$\left(\text{e.g., } \frac{|m \cap r|}{|r|}\right).$$

As shown, the intersection τ between the region r and $m_p \geq \tau$, the intersection between the region r and m≥τ, and the intersection between the region r and m'<τ. Based on determining that the intersection between the region r and the node m is greater than the intersection threshold t and the intersection between the region r and the direct descendant node m' (and all other direct descendant nodes) is less than the intersection threshold t, the hierarchical semantic grouping system 106 maps the region r (and corresponding vector paths) to the node m.

Figure 7A:
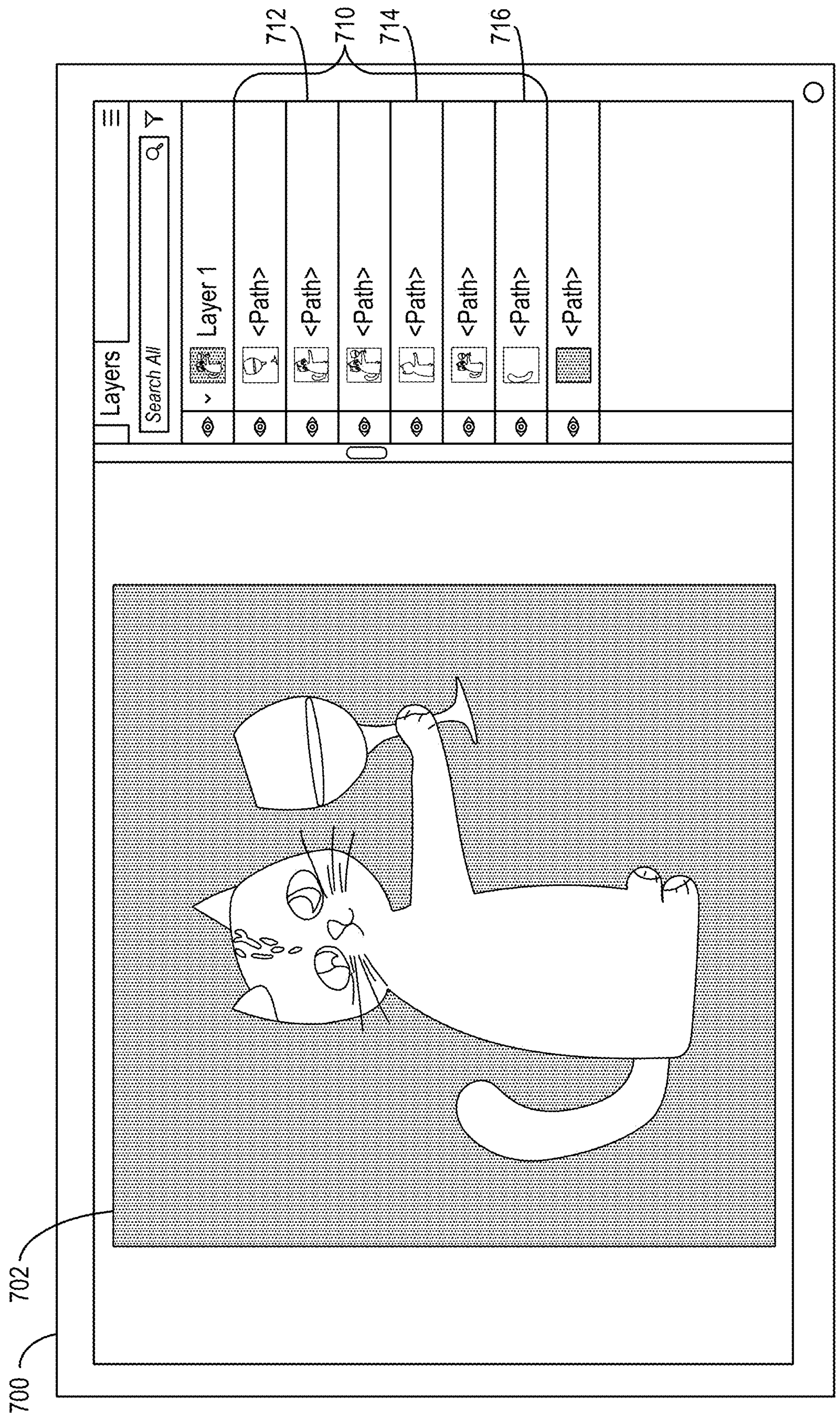
Fig. 7A (Prior Art)
FIGS. 7A-7B illustrate an example of providing a vector hierarchy interface within a graphical user interface based on a hierarchical semantic structure in accordance with one or more embodiments.
Figure 7B:
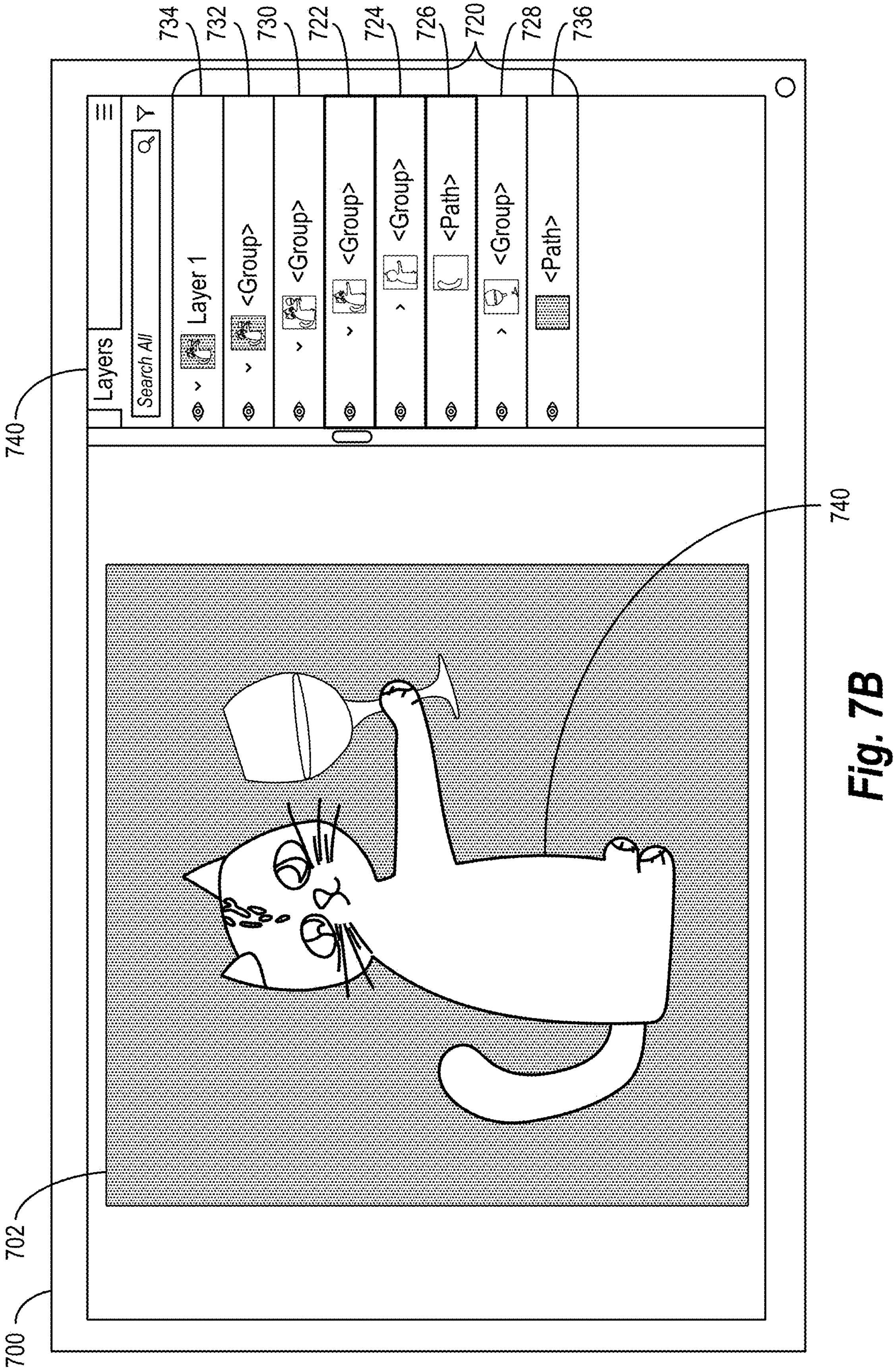

As mentioned, the hierarchical semantic grouping system 106 provides an efficient, intuitive graphical user interface for interacting with the hierarchical semantic structure of the vector paths. FIGS. 7A-7B illustrate an example of providing a vector hierarchy interface within a graphical user interface based on a hierarchical semantic structure in accordance with one or more embodiments.

In particular, FIG. 7A illustrates an example of an existing vectorization system that does not incorporate a hierarchical semantic structure as taught by the hierarchical semantic grouping system 106. As shown, the client device 700 for the existing vectorization system utilizes a vector-based application (e.g., an image editing application for generating or editing vector images) to modify a raster image 702. As shown, based on a client device interaction, the vector-based application provides a set of vector paths 710 that correspond to the content of the raster image 702. In particular, the set of vector paths are provided in a flat hierarchical structure without an apparent organization between the vector paths. Interacting with the set of vector paths 710 is complicated by the presentation of the set of vector paths 710 within the graphical user interface. To illustrate, to select the vector paths associated with the cat requires locating and individually selecting the unorganized vector paths of vector path 712, vector path 714, and vector path 716. Indeed, as demonstrated by FIG. 7A, as the complexity of the geometry within the raster image 702 increases, utilizing the flat hierarchical structure for the set of vector paths 710 becomes even more unmanageable.

In contrast, as shown by FIG. 7B, the hierarchical semantic grouping system 106 provides a vector hierarchy interface 740 to organize the set of vector paths 720 in hierarchical layers. In particular, the hierarchical semantic grouping system 106 utilizes the vector hierarchy interface 740 to provide the set of vector paths 720 in layers corresponding to a hierarchical tree based upon semantic groups as described in relation to previous figures. In particular, as described above in relation to FIGS. 2-6, the hierarchical semantic grouping system 106 organizes the layers of the hierarchical semantic structure based on an overlap between the nodes (and corresponding masks, vector regions, and/or vector paths).

To illustrate, the layer for the semantic group 732 corresponds to the vector paths associated with the cat, the glass, and the background. In addition, layer for the semantic group 732 is subdivided into sub-layers for the semantic group 728 and semantic group 730. As shown, the semantic group 728 corresponds to the vector paths associated with the background (but not the vector paths associated with the cat and the glass). Furthermore, the semantic group 730 corresponds to the vector paths associated with the cat and the glass (but not the vector path associated with background). Indeed, the vector paths of the layer for the semantic group 732 meet an overlap threshold with the vector path of the semantic group 728 and meet the overlap threshold with the vector path of the semantic group 730. Moreover, the vector paths of the semantic group 728 and semantic group 730 do not meet the overlap threshold with each other.

To further clarify, the set of vector paths 720 correspond to branches of a hierarchical tree. For example, "Layer 1" is (e.g., semantic group 734) is mapped to the root node of the hierarchical tree. As shown, semantic group 732 is mapped to a branch of the hierarchical tree and corresponds to a child node of the root node. As further shown, semantic group 730 and vector path 736 are mapped to branches of the hierarchical tree and correspond to child nodes of semantic group 732 (e.g., child nodes of the node corresponding to semantic group 732). Moreover, semantic group 722 and semantic group 728 are mapped to branches of the hierarchical tree and are child nodes of semantic group 722 (e.g., child nodes of the node corresponding to semantic group 722). As also shown, semantic group 724 is mapped to a branch of the hierarchical tree and is a child node of semantic group 722 (e.g., child node of the node corresponding to semantic group 722). As also shown, semantic group 724 is mapped to a node of the hierarchical tree and is a child node of semantic group 722 (e.g., child node of the node corresponding to semantic group 722).

As shown in FIG. 7B, the client device can easily select and modify groups of elements utilizing the layers based on their semantic relationships or similarities. To illustrate, based on a user interaction with the vector hierarchy interface 740 to select the semantic group 722 (and/or associated layer), the hierarchical semantic grouping system 106 selects the semantically related subset of vector paths associated with the selected region of the vector image (e.g., the semantic group 722 and the vector path 726). In certain embodiments, the hierarchical semantic grouping system 106 selects the semantic group 722 (and/or semantically related subgroups) based on a user interaction with the semantic group 728 (e.g., the cat). As another example, based on a user device interaction selecting semantic group 730, the hierarchical semantic grouping system 106 selects the underlying layers of semantic group 730, semantic group 722, semantic group 724, and vector path 726. As another example, based on a user device interaction selecting the vector path 726, the hierarchical semantic grouping system 106 selects the individual vector path outlining the tail. Indeed, utilizing the vector hierarchy interface, the client device can make modifications at different levels of detail, zooming in to edit individual elements, or zooming out to edit groups of elements as a single unit.

Figure 8:
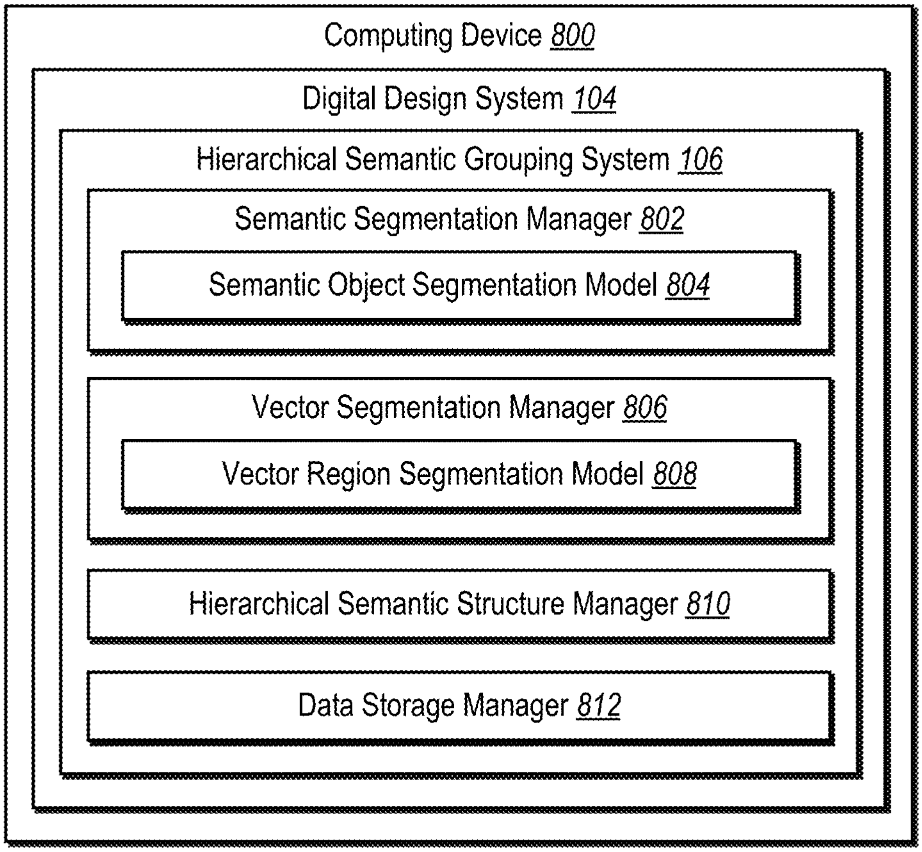
FIG. 8 illustrates a diagram of an example architecture of the hierarchical semantic grouping system in accordance with one or more embodiments.

Turning now to FIG. 8, additional detail will now be provided regarding various components and capabilities of the hierarchical semantic grouping system 106. In particular, FIG. 8 illustrates the hierarchical semantic grouping system 106 implemented by the computing device 800 (e.g., the server device(s) 102 and/or one of the client device(s) 110 discussed above with reference to FIG. 1). Additionally, the hierarchical semantic grouping system 106 is also part of the digital design system 104. As shown in FIG. 8, the hierarchical semantic grouping system 106 includes, but is not limited to, a semantic segmentation manager 802, a vector segmentation manager 806, a hierarchical semantic structure manager 810, and a data storage manager 812.

As just mentioned, and as illustrated in FIG. 8, the hierarchical semantic grouping system 106 includes the semantic segmentation manager 802. In one or more embodiments, the semantic segmentation manager 802 manages the segmentation of objects into semantic groups within the raster image. The semantic segmentation manager 802 utilizes a semantic object segmentation model 804 to segment an image based on semantic objects and visually distinct portions of the semantic objects within the image. The semantic segmentation manager 802 utilizes the semantic object segmentation model 804 to generate object masks corresponding to the objects and visual distinct portions of objects within the raster image.

Additionally, as shown in FIG. 8, the hierarchical semantic grouping system 106 includes the vector segmentation manager 806. The vector segmentation manager 806 manages the generation and selection of vector regions corresponding to regions within the raster image. In particular, the vector segmentation manager 806 utilizes vector region segmentation model 808 to generate vector regions that correspond to visually distinct regions within the raster image. As mentioned, the vector segmentation manager 806 generates vector regions that indicate traced curves from the raster image.

As further shown in FIG. 8, the hierarchical semantic grouping system 106 includes the hierarchical semantic structure manager 810. In particular, the hierarchical semantic grouping system 106 utilizes the hierarchical semantic structure manager 810 to generate a hierarchical semantic structure that corresponds to the object masks. In particular, the hierarchical semantic structure manager 810 receives a set of object masks from the semantic segmentation manager 802 that correspond to semantic objects within the raster image. Furthermore, the hierarchical semantic structure manager 810 generates a hierarchical semantic structure comprising nodes that are organized in a hierarchical tree that corresponds to the semantic relationship between the set of object masks. In addition, the hierarchical semantic structure manager 810 maps a set of vector regions to the nodes. In particular, the hierarchical semantic structure manager 810 receives a set of vector regions from the vector segmentation manager 806 and maps the set of vector regions to the hierarchical semantic structure based on an overlap between the set of vector regions and the nodes (and corresponding object masks).

Additionally, as shown, the hierarchical semantic grouping system 106 includes a data storage manager 812. In particular, data storage manager 812 (implemented by one or more memory devices) stores the digital design documents, including the raster images. The data storage manager 812 facilitates the use of the digital design documents by the hierarchical semantic grouping system 106.

Each of the components 802-812 of the hierarchical semantic grouping system 106 includes software, hardware, or both. For example, the components 802-812 include one or more instructions stored on a computer-readable storage medium and executable by processors of one or more computing devices, such as a client device or server device. When executed by the one or more processors, the computer-executable instructions of the hierarchical semantic grouping system 106 causes the computing device(s) to perform the methods described herein.

Alternatively, the components 802-812 include hardware, such as a special-purpose processing device to perform a certain function or group of functions. Alternatively, the components 802-812 of the hierarchical semantic grouping system 106 include a combination of computer-executable instructions and hardware.

Furthermore, the components 802-812 of the hierarchical semantic grouping system 106 are implemented as one or more operating systems, as one or more stand-alone applications, as one or more modules of an application, as one or more plug-ins, as one or more library functions or functions called by other applications, and/or as a cloud-computing model. Thus, in some embodiments, the components 802-812 of the hierarchical semantic grouping system 106 are implemented as a stand-alone application, such as a desktop or mobile application. Furthermore, in some embodiments, the components 802-812 of the hierarchical semantic grouping system 106 are implemented as one or more web-based applications hosted on a remote server. Alternatively, or additionally, the components 802-812 of the hierarchical semantic grouping system 106 are implemented in a suite of mobile device applications or "apps." For example, in one or more embodiments, the hierarchical semantic grouping system 106 comprises or operates in connection with digital software applications such as: ADOBE® PHOTOSHOP®, ADOBE® ILLUSTRATOR®, ADOBE® EXPRESS, ADOBE® XD, ADOBE® INDESIGN®, and ADOBE® CREATIVE CLOUD®. The foregoing are either registered trademarks or trademarks of Adobe Inc. in the United States and/or other countries.

Figure 9:
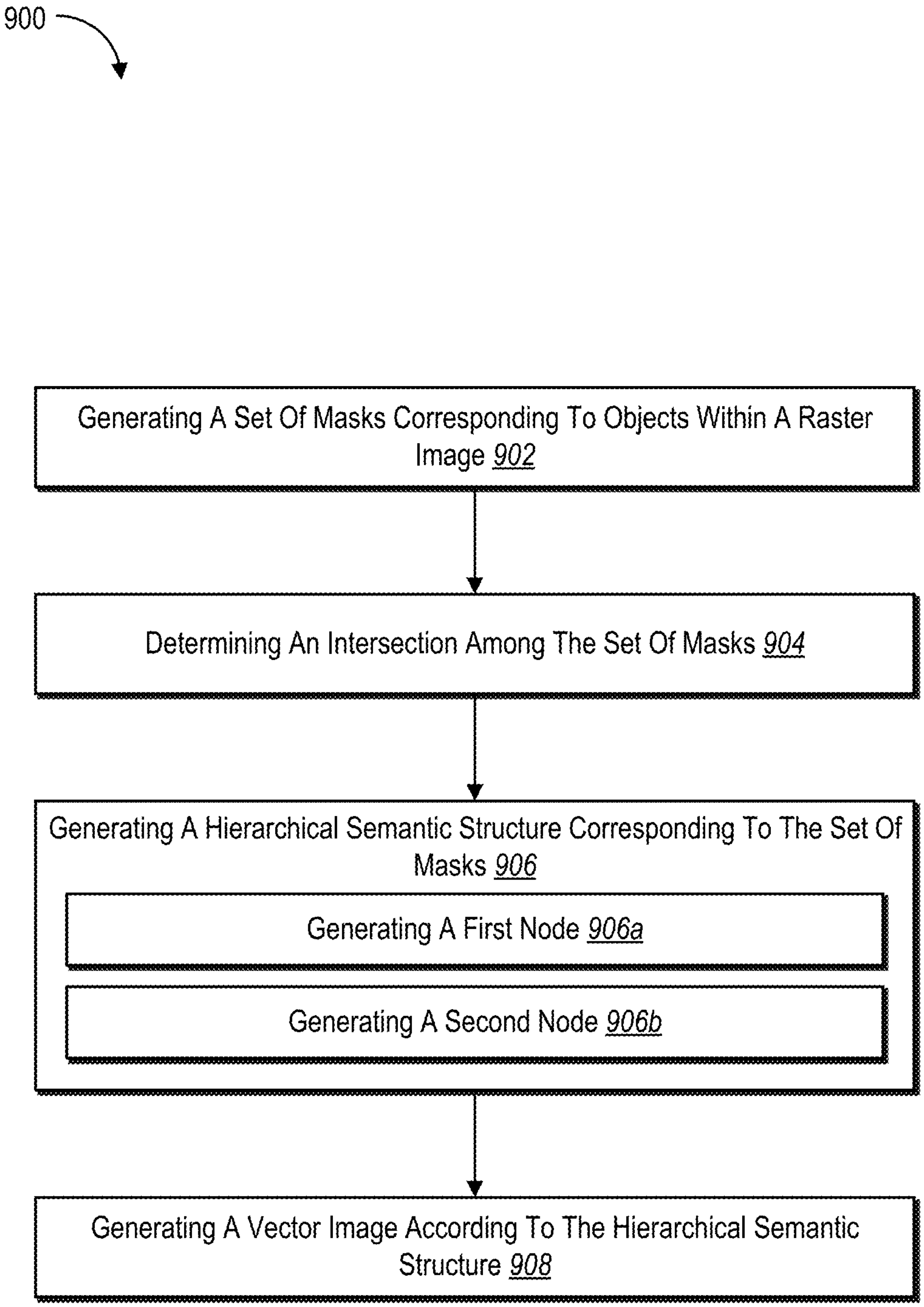
FIG. 9 illustrates a flowchart of a series of acts for generating a vector image according to a hierarchical semantic structure in accordance with one or more embodiments.

FIGS. 1-8, the corresponding text, and the examples provide a number of different methods, systems, devices, and non-transitory computer-readable media of the hierarchical semantic grouping system 106. In addition to the foregoing, one or more embodiments are also described in terms of flowcharts comprising acts for accomplishing a particular result, as shown in FIG. 9. In some embodiments, the acts shown in FIG. 9 are performed in connection with more or fewer acts. Further, the acts may be performed in differing orders. Additionally, in various embodiments, the acts described herein are repeated or performed in parallel with one another or parallel with different instances of the same or similar acts. A non-transitory computer-readable medium includes instructions that, when executed by one or more processors, cause a computing device to perform the acts of FIG. 9. In some embodiments, a system is configured to perform the acts of FIG. 9. Alternatively, the acts of FIG. 9 are performed as part of a computer-implemented method.

FIG. 9 illustrates a flowchart of a series of acts 900 for modifying a digital document with a hierarchical semantic grouping system 106 in accordance with one or more embodiments. While FIG. 9 illustrates acts according to one embodiment, alternative embodiments omit, add to, reorder, and/or modify any acts shown in FIG. 9.

FIG. 9 illustrates an example series of acts 900 for utilizing a hierarchical semantic grouping system 106 to generate a vector image according to a hierarchical semantic structure. In particular, in certain embodiments, the series of acts 900 includes an act 902 of generating a set of masks corresponding to objects within a raster image. Specifically, in one or more embodiments, the act 902 includes generating, utilizing a semantic object segmentation model, a set of masks corresponding to objects depicted within a raster image. In particular, in certain embodiments, the series of acts 900 includes an act 904 of determining an intersection among the set of masks. In particular, in one or more embodiments, the act 904 includes determining an intersection between a first mask and a second mask from among the set of masks. As illustrated, in some embodiments, the series of acts 900 also includes an act 906 of generating a hierarchical semantic structure corresponding to the set of masks, a sub-act 906*a* of generating a first node, and a sub-act 906*b* of generating a second node. In particular, in one or more embodiments, the act 906 includes generating a hierarchical semantic structure comprising a set of nodes corresponding to the set of masks by generating a first node for the first mask and a second node for the second mask arranged according to the intersection. Furthermore, in certain embodiments, the series of acts 900 includes an act 908 of generating a vector image according to the hierarchical semantic structure. Specifically, in one or more embodiments, the act 908 includes generating a vector image from the raster image according to the hierarchical semantic structure.

In addition (or in the alternative) to the acts described above, in certain embodiments, the hierarchical semantic grouping system series of acts 900 includes determining the intersection based on an amount of overlap between the first mask and the second mask. In some embodiments, the series of acts 900 also includes determining a first position in the hierarchical semantic structure for the first mask and a second position in the hierarchical semantic structure for the second mask based on a comparison of the intersection to an intersection threshold. Moreover, in one or more embodiments, the hierarchical semantic grouping system 106 series of acts 900 includes determining the amount of overlap based on a ratio of an overlapping area of the first mask and the second mask and a combined area of the first mask and the second mask.

Furthermore, in one or more embodiments, the hierarchical semantic grouping system series of acts 900 includes generating the set of masks utilizing a semantic object segmentation model to generate masks corresponding to the objects based on parameters of the semantic object segmentation model comprising: a filtering threshold using a predicted mask quality; and a number of points sampled along a side of the raster image. Moreover, one or more embodiments, the series of acts 900 includes generating a partial order representation for the set of masks. Further still, in one or more embodiments, the series of acts 900 includes generating the hierarchical semantic structure based on the partial order representation for the set of masks.

Moreover, in one or more embodiments, the series of acts 900 includes extracting, utilizing a vector region segmentation model, a vector region indicating traced curves from the raster image. In certain embodiments, the series of acts 900 further includes mapping the vector region to a node of the set of nodes based on increasing an intersection of the vector region with the set of nodes. Moreover, one or more embodiments, the series of acts 900 includes modifying the hierarchical semantic structure by mapping a set of vector regions to the set of nodes according to intersections between the set of vector regions and the set of nodes. Furthermore, in one or more embodiments, the series of acts 900 includes providing, for display within a graphical user interface of a client device, a vector hierarchy interface depicting a hierarchical arrangement of the set of vector regions according to the hierarchical semantic structure.

Moreover, in one or more embodiments, the series of acts 900 includes determining, from the set of nodes, a subset of nodes within a neighborhood of a region. In one or more embodiments, the series of acts 900 includes determining an intersection between the region and one or more nodes of the subset of nodes based on an amount of overlap of the region with the one or more nodes. Further still, in one or more embodiments, the series of acts 900 includes assigning the region to a node within the hierarchical semantic structure based on: determining, for the node, that the intersection between the region and the node exceeds an intersection threshold; and determining, for the node, a direct descendant node where the intersection between the region and the direct descendant node is less than the intersection threshold.

Moreover, in one or more embodiments, the series of acts 900 includes generating, utilizing a semantic object segmentation model, a set of masks corresponding to objects depicted within a raster image. In one or more embodiments, the series of acts 900 further includes generating a hierarchical semantic structure comprising a set of nodes corresponding to the set of masks and arranged according to intersections among the set of masks. In addition, in one or more embodiments, the series of acts 900 includes extracting, utilizing a vector region segmentation model, a set of vector regions corresponding to content depicted in the raster image. Furthermore, in one or more embodiments, the series of acts 900 includes modifying the hierarchical semantic structure by mapping the set of vector regions to the set of nodes according to intersections between the set of vector regions and the set of masks.

In addition, in one or more embodiments, the series of acts 900 includes generating, based on a semantic analysis of the raster image, the set of masks by segmenting the raster image into masks associated with objects and/or identifiable portions of the objects. Moreover, in one or more embodiments, the series of acts 900 includes filtering the set of masks by one or more of removing duplicate masks within the set of masks, reducing noise within the set of masks, or filling holes within the set of masks. In one or more embodiments, the series of acts 900 includes determining the intersections among the set of masks based on pairwise overlaps for pairs of nodes within the set of nodes. Furthermore, in one or more embodiments, the series of acts 900 includes generating the hierarchical semantic structure based on relative amounts of overlaps among the pairwise overlaps for the pairs of nodes.

In some embodiments, the series of acts 900 also includes generating the hierarchical semantic structure by mapping a first node and a second node to a semantic group based on determining an area of the first node is less than an area of the second node. Moreover, in one or more embodiments, the hierarchical semantic grouping system 106 series of acts 900 includes generating the hierarchical semantic structure by mapping a first node and a second node to a semantic group based on determining a ratio of a pairwise overlap for the first node with the second node and a combined area of the first node with the second node is more than an intersection threshold.

Further still, in some embodiments, the hierarchical semantic grouping system 106 series of acts 900 includes determining a first intersection of a vector region of the set of vector regions with a first node of the set of nodes is greater than an intersection threshold. Furthermore, in one or more embodiments, the hierarchical semantic grouping system series of acts 900 includes determining a second intersection of the vector region with a second node of the set of nodes is less than an intersection threshold. Moreover, one or more embodiments, the series of acts 900 includes mapping the vector region to the first node based on the first intersection and the second intersection.

Further still, in one or more embodiments, the series of acts 900 includes determining intersections between the set of vector regions and the set of nodes based on an amount of overlap of the set of vector regions with the set of nodes. Moreover, in one or more embodiments, the series of acts 900 includes assigning, for regions of the set of vector regions, nodes within the hierarchical semantic structure based on determining the nodes within the hierarchical semantic structure where the intersections of the set of vector regions with the set of nodes exceed an intersection threshold.

In certain embodiments, the series of acts 900 further includes generating, from a raster image, a hierarchical semantic structure comprising a set of nodes corresponding to masks of objects depicted within the raster image. Moreover, one or more embodiments, the series of acts 900 includes determining, within the hierarchical semantic structure, nodes among the set of nodes corresponding to vector regions indicating vector paths corresponding to content depicted within the raster image. Furthermore, in one or more embodiments, the series of acts 900 includes generating, from the raster image, a vector image including the vector paths of the vector regions. Moreover, in one or more embodiments, the series of acts 900 includes providing, for display on a client device together with the vector image, a vector hierarchy interface depicting a hierarchical arrangement of the vector regions according to the hierarchical semantic structure.

In one or more embodiments, the series of acts 900 includes generating hierarchical layers by determining semantic relationships among the objects within the raster image. Further still, in one or more embodiments, the series of acts 900 includes assigning a region to a node within the hierarchical semantic structure by determining an intersection of the region and the node comprising a ratio of an overlap of the region with the node and a size of the region. Moreover, in one or more embodiments, the series of acts 900 includes assigning a region to a node within the hierarchical semantic structure by determining the intersection exceeds an intersection threshold.

In one or more embodiments, the series of acts 900 further includes selecting, based on a user interaction with the vector hierarchy interface, a semantically related subset of the vector paths associated with a region of the vector image. In addition, in one or more embodiments, the series of acts 900 includes modifying the semantically related subset of the vector paths based on the selection. Furthermore, in one or more embodiments, the series of acts 900 includes selecting, based on a user interaction with the vector hierarchy interface, a vector path mapped to a node within the hierarchical semantic structure. Moreover, one or more embodiments, the series of acts 900 includes determining a semantically related subset of the vector paths associated with the vector path based on the hierarchical semantic structure. Further still, in one or more embodiments, the series of acts 900 includes modifying, the semantically related subset of the vector paths based on the selection.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
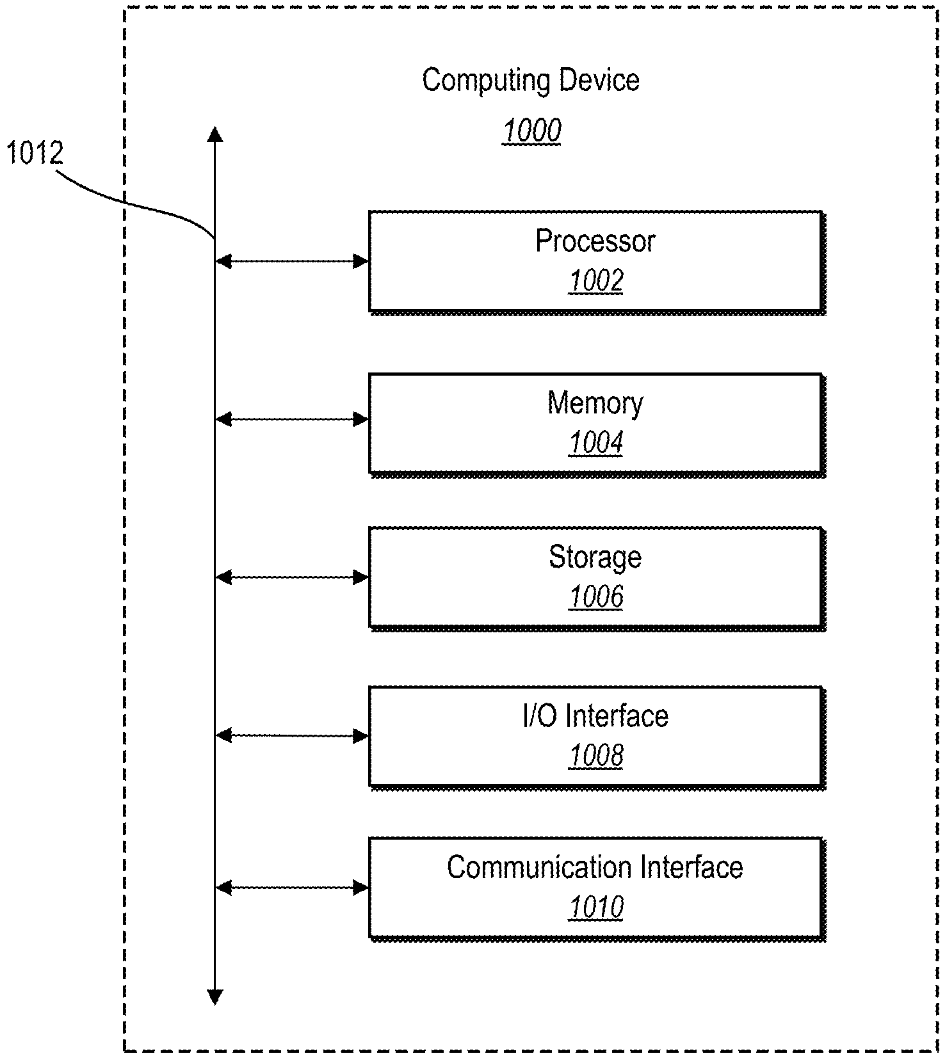
FIG. 10 illustrates a block diagram of an example computing device in accordance with one or more embodiments.

FIG. 10 illustrates a block diagram of an example computing device 1000 that may be configured to perform one or more of the processes described above. One will appreciate that one or more computing devices, such as the computing device 1000 may represent the computing devices described above (e.g., server device(s) 102, client device(s) 110, and computing device 1000). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular embodiment.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
generating, utilizing a semantic object segmentation model, a set of masks corresponding to objects depicted within a raster image;
determining an intersection between a first mask and a second mask from among the set of masks;
generating a hierarchical semantic structure comprising a set of nodes corresponding to the set of masks by determining a first position in the hierarchical semantic structure for the first mask and a second position in the hierarchical semantic structure for the second mask based on a comparison of the intersection to an intersection threshold; and
generating a vector image from the raster image according to the hierarchical semantic structure.

2. The computer-implemented method of claim 1, wherein generating the hierarchical semantic structure further comprises determining the intersection based on an amount of overlap between the first mask and the second mask.

3. The computer-implemented method of claim 2, wherein the amount of overlap is determined based on a ratio of an overlapping area of the first mask and the second mask and a combined area of the first mask and the second mask.

4. The computer-implemented method of claim 1, further comprising generating the set of masks utilizing a semantic object segmentation model to generate masks corresponding to the objects and identifiable portions of the objects based on parameters of the semantic object segmentation model comprising:

a filtering threshold using a predicted mask quality; and a number of points sampled along a side of the raster image.

5. The computer-implemented method of claim 1, further comprising:

generating a partial order representation for the set of masks; and generating the hierarchical semantic structure based on the partial order representation for the set of masks.

6. The computer-implemented method of claim 1, further comprising:

extracting, utilizing a vector region segmentation model, a vector region indicating traced curves from the raster image; and mapping the vector region to a node of the set of nodes based on increasing an intersection of the vector region with the set of nodes.

7. The computer-implemented method of claim 1, further comprising:

modifying the hierarchical semantic structure by mapping a set of vector regions to the set of nodes according to intersections between the set of vector regions and the set of nodes; and providing, for display within a graphical user interface of a client device, a vector hierarchy interface depicting a hierarchical arrangement of the set of vector regions according to the hierarchical semantic structure.

8. The computer-implemented method of claim 1, further comprising:

determining, from the set of nodes, a subset of nodes within a neighborhood of a region;

determining an intersection between the region and one or more nodes of the subset of nodes based on an amount of overlap of the region with the one or more nodes; and assigning the region to a node within the hierarchical semantic structure based on:

determining, for the node, that the intersection between the region and the node exceeds a region-to-node intersection threshold; and determining, for the node, a direct descendant node where the intersection between the region and the direct descendant node is less than the region-to-node intersection threshold.

9. A system comprising:

one or more memory devices; and one or more processors configured to cause the system to:

generate, utilizing a semantic object segmentation model, a set of masks corresponding to objects depicted within a raster image;

generate a hierarchical semantic structure comprising a set of nodes corresponding to the set of masks and arranged according to intersections among the set of masks;

extract, utilizing a vector region segmentation model, a set of vector regions corresponding to content depicted in the raster image; and modify the hierarchical semantic structure by mapping the set of vector regions to the set of nodes according to intersections between the set of vector regions and the set of masks.

10. The system of claim 9, wherein the one or more processors are further configured to cause the system to generate, based on a semantic analysis of the raster image, the set of masks by segmenting the raster image into masks associated with objects and identifiable portions of the objects.

11. The system of claim 9, wherein the one or more processors are further configured to cause the system to filter the set of masks by one or more of removing duplicate masks within the set of masks, reducing noise within the set of masks, or filling holes within the set of masks.

12. The system of claim 9, wherein the one or more processors are further configured to cause the system to generate the hierarchical semantic structure by:

determining the intersections among the set of masks based on pairwise overlaps for pairs of nodes within the set of nodes; and generating the hierarchical semantic structure based on relative amounts of overlaps among the pairwise overlaps for the pairs of nodes.

13. The system of claim 9, wherein the one or more processors are further configured to cause the system to generate the hierarchical semantic structure by mapping a first node and a second node to a semantic group based on:

determining an area of the first node is less than an area of the second node; and determining a ratio of a pairwise overlap for the first node with the second node and a combined area of the first node with the second node is more than an intersection threshold.

14. The system of claim 9, wherein the one or more processors are further configured to cause the system to map the set of vector regions to the set of nodes by:

determining a first intersection of a vector region of the set of vector regions with a first node of the set of nodes is greater than an intersection threshold;

determining a second intersection of the vector region with a second node of the set of nodes is less than an intersection threshold; and mapping the vector region to the first node based on the first intersection and the second intersection.

15. The system of claim 9, wherein the one or more processors are further configured to cause the system to:

determine intersections between the set of vector regions and the set of nodes based on an amount of overlap of the set of vector regions with the set of nodes; and assign, for regions of the set of vector regions, nodes within the hierarchical semantic structure based on determining the nodes within the hierarchical semantic structure where the intersections of the set of vector regions with the set of nodes exceed an intersection threshold.

16. A non-transitory computer readable medium storing executable instructions which, when executed by a processing device, cause the processing device to perform operations comprising:

generating, from a raster image, a hierarchical semantic structure comprising a set of nodes corresponding to masks of objects depicted within the raster image by determining positions in the hierarchical semantic structure for a plurality of the masks based on a comparison of an intersection threshold to one or more intersections between the plurality of the masks;

determining, within the hierarchical semantic structure, nodes among the set of nodes corresponding to vector regions indicating vector paths corresponding to content depicted within the raster image;

generating, from the raster image, a vector image including the vector paths of the vector regions; and providing, for display on a client device together with the vector image, a vector hierarchy interface depicting a hierarchical arrangement of the vector regions according to the hierarchical semantic structure.

17. The non-transitory computer readable medium of claim 16, wherein generating the hierarchical semantic structure further comprises generating hierarchical layers by determining semantic relationships among the objects within the raster image.

18. The non-transitory computer readable medium of claim 16, wherein the operations further comprise assigning a region to a node within the hierarchical semantic structure by:

determining an intersection of the region and the node comprising a ratio of an overlap of the region with the node and a size of the region; and determining the intersection exceeds a region-to-node intersection threshold.

19. The non-transitory computer readable medium of claim 16, wherein the operations further comprise:

selecting, based on a user interaction with the vector hierarchy interface, a semantically related subset of the vector paths associated with a region of the vector image; and modifying the semantically related subset of the vector paths based on the selection.

20. The non-transitory computer readable medium of claim 16, wherein the operations further comprise:

selecting, based on a user interaction with the vector hierarchy interface, a vector path mapped to a node within the hierarchical semantic structure;

determining a semantically related subset of the vector paths associated with the vector path based on the hierarchical semantic structure; and modifying, the semantically related subset of the vector paths based on the selection.

* * * * *